United States Patent
LeCompte

(10) Patent No.: US 11,884,480 B2
(45) Date of Patent: Jan. 30, 2024

(54) BLASTING SYSTEM WITH DUAL DISPENSERS FROM SINGLE CHAMBER

(71) Applicant: MMLJ, Inc., Houston, TX (US)

(72) Inventor: Benjamin LeCompte, Houston, TX (US)

( * ) Notice: Subject to any disclaimer, the term of this patent is extended or adjusted under 35 U.S.C. 154(b) by 634 days.

(21) Appl. No.: 17/119,628

(22) Filed: Dec. 11, 2020

(65) Prior Publication Data

US 2021/0163218 A1    Jun. 3, 2021

Related U.S. Application Data

(63) Continuation-in-part of application No. 16/736,595, filed on Jan. 7, 2020, now Pat. No. 11,285,580, which is a continuation-in-part of application No. 15/812,206, filed on Nov. 14, 2017, now Pat. No. 10,569,386, which is a continuation-in-part of application No. 15/712,453, filed on Sep. 22, 2017, now Pat. No. 10,449,657, said application No. 15/812,206 is a continuation-in-part of application No. 14/848,330, filed on Sep. 8, 2015, now Pat. No. 9,844,851, and a continuation-in-part of application No. 14/773,694, filed on Sep. 8, 2015, now Pat. No. 9,849,560, said application No. 15/712,453 is a continuation-in-part of application No. 14/848,330, (Continued)

(51) Int. Cl.
| | | |
|---|---|---|
| *B65D 88/06* | (2006.01) | |
| *B24B 57/02* | (2006.01) | |
| *B24B 57/04* | (2006.01) | |

(52) U.S. Cl.
CPC .............. *B65D 88/06* (2013.01); *B24B 57/02* (2013.01); *B24B 57/04* (2013.01)

(58) Field of Classification Search
CPC ......... B65D 88/06; B24B 57/02; B24B 57/04; B24C 11/005; B24C 1/086; B24C 5/04; B24C 7/0046; C23F 11/08
See application file for complete search history.

(56) References Cited

U.S. PATENT DOCUMENTS

| | | | | |
|---|---|---|---|---|
| 3,343,304 A | * | 9/1967 | Eppler | ...................... B24C 3/22 451/99 |
| 5,195,280 A | * | 3/1993 | Nicholson | ............. B24C 7/0015 451/99 |

(Continued)

FOREIGN PATENT DOCUMENTS

| | | | | |
|---|---|---|---|---|
| CN | | 114083441 A * | 2/2022 | |
| JP | | 2000190222 A * | 7/2000 | ............. B24B 37/04 |

(Continued)

*Primary Examiner* — Marc Carlson
(74) *Attorney, Agent, or Firm* — Shannon Warren

(57) ABSTRACT

A tank assembly. The tank assembly comprises a shell, a plurality of conical dispensers, a plurality of drawtubes, a plurality of drawtube apertures, a slurry reservoir, one or more spray equipment and a slurry mixture. The slurry reservoir comprises a fluid reservoir within the shell of the tank assembly. The slurry reservoir comprises an upper reservoir and a conical dispensers reservoir. The conical dispensers reservoir can comprise a fluid space within the plurality of conical dispensers. each among the plurality of drawtubes comprise a drawtube axis. The plurality of drawtubes comprise at least a first drawtube and a second drawtube.

15 Claims, 23 Drawing Sheets

Related U.S. Application Data filed on Sep. 8, 2015, now Pat. No. 9,844,851, said application No. 14/773,694 is a continuation-in-part of application No. PCT/US2014/022170, filed on Mar. 7, 2014.

(60) Provisional application No. 62/880,540, filed on Jul. 30, 2019, provisional application No. 62/398,225, filed on Sep. 22, 2016.

(56) References Cited

U.S. PATENT DOCUMENTS

| | | | | |
|---|---|---|---|---|
| 5,827,114 A | * | 10/1998 | Yam | B24C 7/0038 |
| | | | | 451/60 |
| 5,957,759 A | * | 9/1999 | Cardenas | B24B 57/02 |
| | | | | 451/60 |
| 6,200,202 B1 | * | 3/2001 | Eastman, Jr. | B24B 37/04 |
| | | | | 451/100 |
| 7,004,824 B1 | * | 2/2006 | Madanshetty | B24B 37/04 |
| | | | | 451/910 |
| 2002/0020690 A1 | * | 2/2002 | Yancey | B24B 37/04 |
| | | | | 216/84 |
| 2002/0061722 A1 | * | 5/2002 | Kondo | B24B 37/04 |
| | | | | 451/60 |
| 2003/0003851 A1 | * | 1/2003 | Cann | B24B 37/04 |
| | | | | 451/36 |
| 2003/0207656 A1 | * | 11/2003 | Lo | B01F 27/811 |
| | | | | 451/60 |
| 2004/0002292 A1 | * | 1/2004 | Fukushima | H01L 21/3212 |
| | | | | 451/41 |
| 2006/0026906 A1 | * | 2/2006 | Stark | B24B 37/04 |
| | | | | 51/307 |
| 2016/0158915 A1 | * | 6/2016 | Adan | B24C 7/0084 |
| | | | | 451/90 |
| 2017/0225297 A1 | * | 8/2017 | Trull, Jr. | B24C 7/0038 |
| 2018/0043408 A1 | * | 2/2018 | Nakano | B24C 1/086 |
| 2018/0169835 A1 | * | 6/2018 | Eliason | B24C 7/0038 |
| 2020/0262030 A1 | * | 8/2020 | LeCompte | B24C 1/086 |

FOREIGN PATENT DOCUMENTS

| | | | | |
|---|---|---|---|---|
| JP | 2000280170 A | * | 10/2000 | B24B 37/04 |
| KR | 100850179 B1 | * | 8/2008 | |

* cited by examiner

SECTION B-B

SECTION A-A

SECTION C-C

SECTION L-L

SECTION AB-AB

SECTION G-G

SECTION D-D

SECTION E-E

SECTION AA-AA

US 11,884,480 B2

BLASTING SYSTEM WITH DUAL DISPENSERS FROM SINGLE CHAMBER

CROSS-REFERENCE TO RELATED APPLICATIONS

This application claims benefit to these US and international filings and their related applications: PCT/US14/22170, 14773694, 15712453, 15812206, 14848330, and 16736595.

STATEMENT REGARDING FEDERALLY SPONSORED RESEARCH OR DEVELOPMENT (IF APPLICABLE

Not applicable.

REFERENCE TO SEQUENCE LISTING, A TABLE, OR A COMPUTER PROGRAM LISTING COMPACT DISC APPENDIX (IF APPLICABLE

Not applicable.

BACKGROUND OF THE INVENTION

No prior art is known to the Applicant

BRIEF SUMMARY OF THE INVENTION

A tank assembly. Said tank assembly comprises a shell, a plurality of conical dispensers, a plurality of drawtubes, a plurality of drawtube apertures, a slurry reservoir, one or more spray equipment and a slurry mixture. Said slurry reservoir comprises a fluid reservoir within said shell of said tank assembly. Said slurry reservoir comprises an upper reservoir and a conical dispensers reservoir. Said conical dispensers reservoir can comprise a fluid space within said plurality of conical dispensers. each among said plurality of drawtubes comprise a drawtube axis. Said plurality of drawtubes comprise at least a first drawtube and a second drawtube. each among said plurality of drawtubes is configured to enter said slurry reservoir at said plurality of drawtube apertures located in a top portion of said slurry reservoir. each among said plurality of conical dispensers are aligned with said plurality of conical dispensers at a bottom portion of said slurry reservoir. each among said drawtube axis is aligned between said plurality of drawtube apertures and a cone flange. each among said plurality of conical dispensers comprise a first diameter and a second diameter. Said first diameter is larger than said second diameter. Said second diameter is at a lowest part of each among said plurality of conical dispensers. Said cone flange connects to said plurality of conical dispensers said lowest part. Said shell comprises an upper shell between a head assembly and a cone assembly. Said plurality of drawtube apertures comprise at least a first drawtube aperture and a second drawtube aperture. Said upper shell comprises an upper shell circumference. at least one among said drawtube axis of said plurality of conical dispensers falls within said upper shell circumference. a lower end of said plurality of drawtubes selectively mate with said cone flange to control a flow of said slurry mixture from said slurry reservoir within said plurality of conical dispensers. each among said plurality of conical dispensers are connected with said one or more spray equipment by one or more fluid lines.

Said tank assembly. Said tank assembly comprises said shell, said plurality of conical dispensers, said plurality of drawtubes, said plurality of drawtube apertures, said slurry reservoir, said one or more spray equipment and said slurry mixture. Said slurry reservoir comprises a fluid reservoir within said shell of said tank assembly. Said slurry reservoir comprises said upper reservoir and said conical dispensers reservoir. Said conical dispensers reservoir can comprise a fluid space within said plurality of conical dispensers. each among said plurality of drawtubes comprise said drawtube axis. Said plurality of drawtubes comprise at least said first drawtube and said second drawtube. each among said plurality of drawtubes is configured to enter said slurry reservoir at said plurality of drawtube apertures located in a top portion of said slurry reservoir. each among said plurality of drawtubes are aligned with said plurality of conical dispensers at a bottom portion of said slurry reservoir. each among said drawtube axis is aligned between said plurality of drawtube apertures and said cone flange. each among said plurality of conical dispensers comprise said first diameter and said second diameter. Said first diameter is larger than said second diameter. Said second diameter is at a lowest part of each among said plurality of conical dispensers. Said cone flange connects to said plurality of conical dispensers said lowest part. Said shell comprises said upper shell between said head assembly and said cone assembly. Said plurality of drawtube apertures comprise at least said first drawtube aperture and said second drawtube aperture. Said upper shell comprises said upper shell circumference. at least one among said drawtube axis of said plurality of conical dispensers falls within said upper shell circumference. a lower end of said plurality of drawtubes selectively mate with said cone flange to control a flow of said slurry mixture from said slurry reservoir within said plurality of conical dispensers. each among said plurality of conical dispensers are connected with said one or more spray equipment by said one or more fluid lines. Said upper shell comprises a central shell portion which comprises a substantially hollow cylinder. Said upper shell comprises a top edge and a bottom edge. Said cone assembly is configured to attach to said bottom edge of said upper shell. Said head assembly is configured to attach to said top edge of said upper shell. each among said plurality of conical dispensers comprises a spider guide within a conical cavity. each of said spider guide is centered along said drawtube axis within said conical cavity, having a center drawtube aperture being configured to allow one among said plurality of drawtubes to pass through. Said spider guide is configured to ensure even movement of said slurry mixture.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
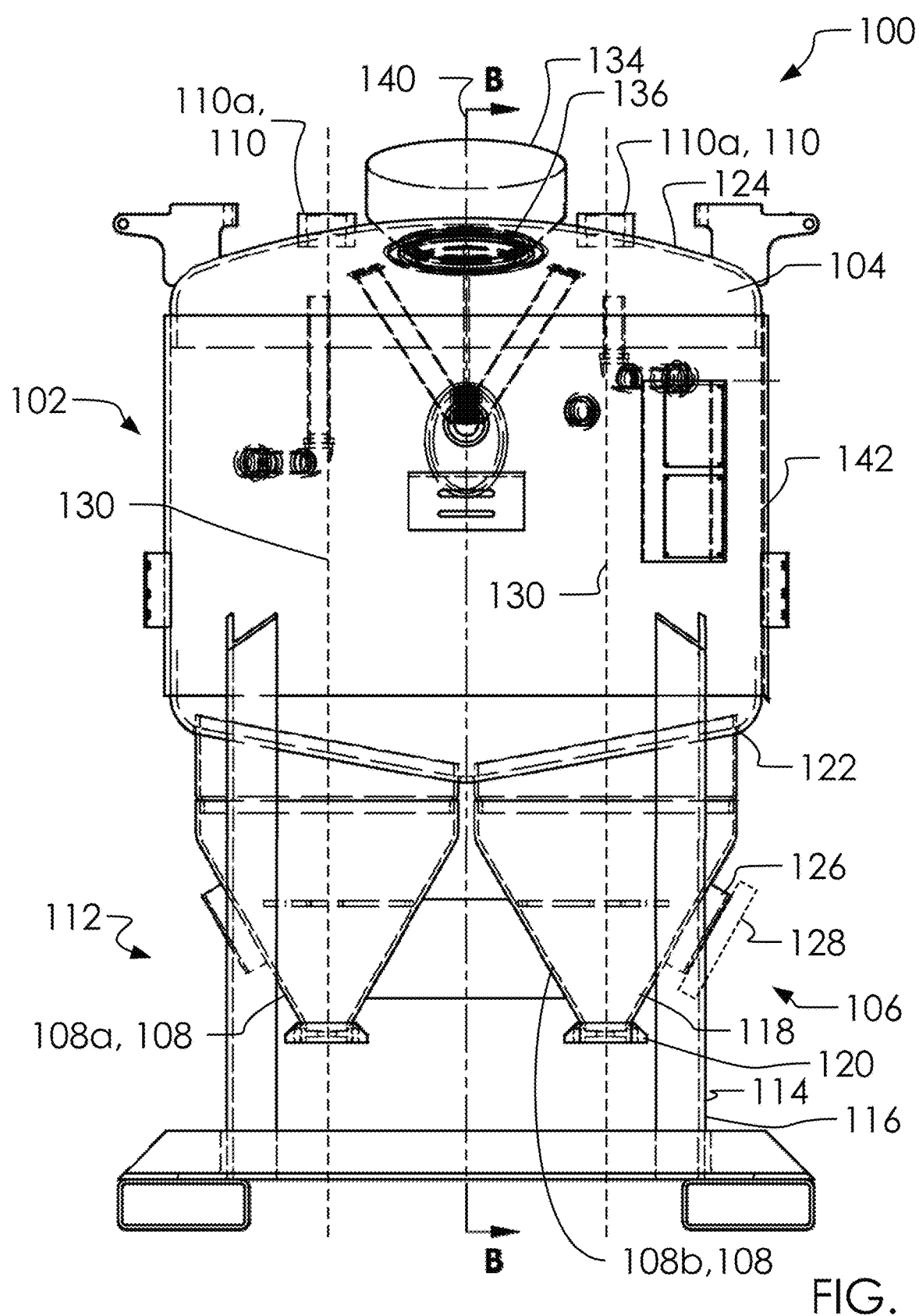
FIG. 1 illustrates an elevated side view of a tank assembly 100.

FIG. 1 illustrates an elevated side view of a tank assembly 100.

In one embodiment, said tank assembly 100 can comprise a shell 102, a head assembly 104 having a plurality of drawtube apertures 110, and a cone assembly 106 having a plurality of conical dispensers 108. Further, said tank assembly 100 can comprise a base 112 having a frame 114 and a legs 116. Each among said plurality of conical dispensers 108 can comprise a lower aperture 118 attached to a cone flange 120. Said plurality of conical dispensers 108 can be arranged at a bottom portion 122 of said tank assembly 100. Said plurality of drawtube apertures 110 can be in a top portion 124 of said tank assembly 100, such as said head assembly 104 and can be aligned with said lower aperture 118 with said cone flange 120 along a drawtube axis 130.

Each among said plurality of conical dispensers 108 can comprise a vibrator bracket 126 configured to attach to a vibrator 128.

Said tank assembly 100 can further comprise one or more rocker pedestals 132, a fill funnel 134 attached to a fill aperture 136, and one or more air supply apertures 138.

As illustrated, a cutaway-B 140 will show a side cross-section view of said tank assembly 100, which will be discussed below.

Said shell 102 can comprise an upper shell 142 between said head assembly 104 and said cone assembly 106.

Figure 2:
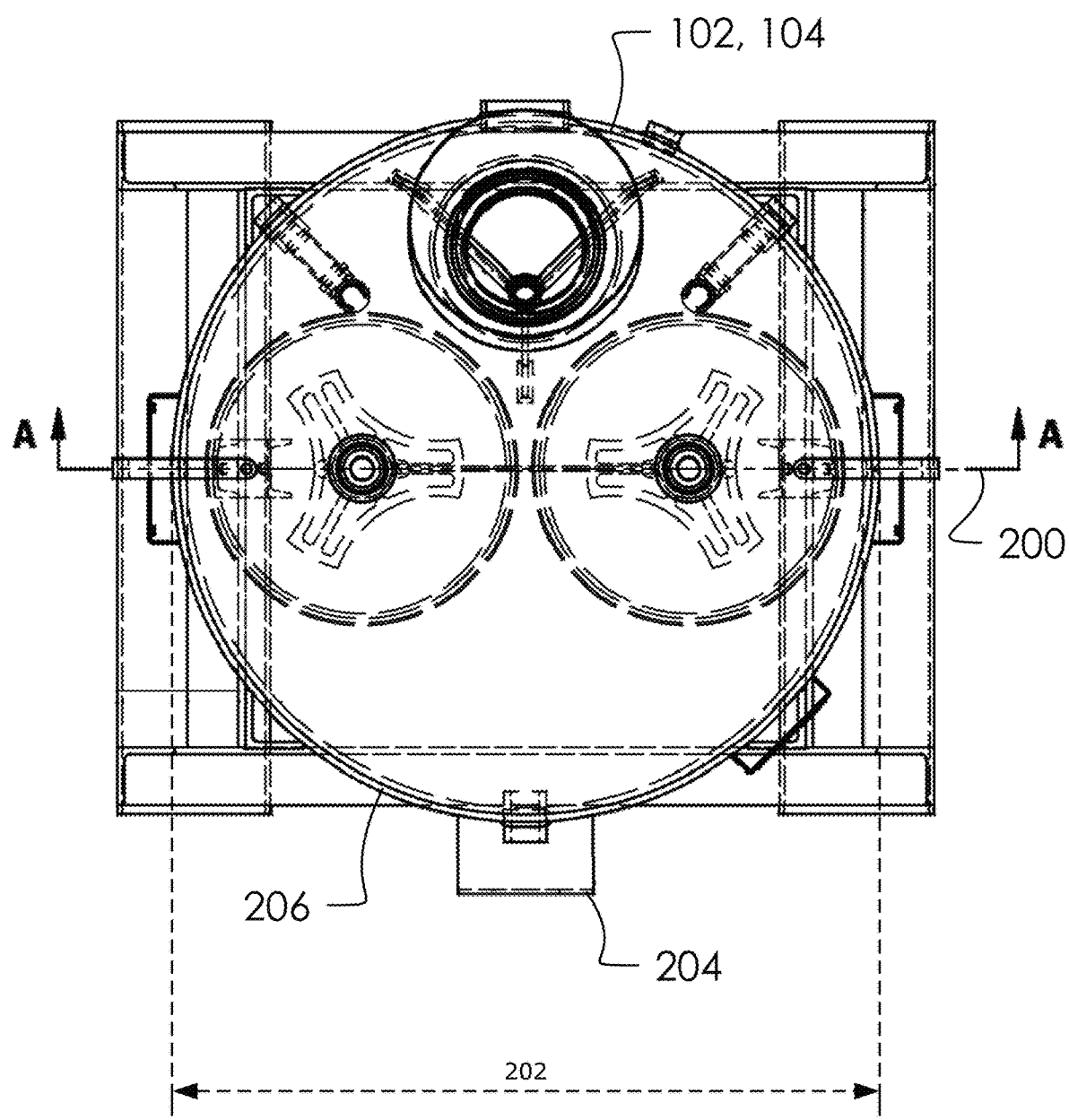
FIG. 2 illustrates an elevated top view of said tank assembly 100.

FIG. 2 illustrates an elevated top view of said tank assembly 100.

As illustrated, a cutaway-A 200 will show a front side cross-section view of said tank assembly 100, which will be discussed below.

Said shell 102 and said head assembly 104 can comprise a substantially round cross-section shape as viewed from above, having a diameter 202.

In one embodiment, said shell 102 can comprise an air inlet bracket 204.

Said upper shell 142 can comprise an upper shell circumference 206.

Figure 3:
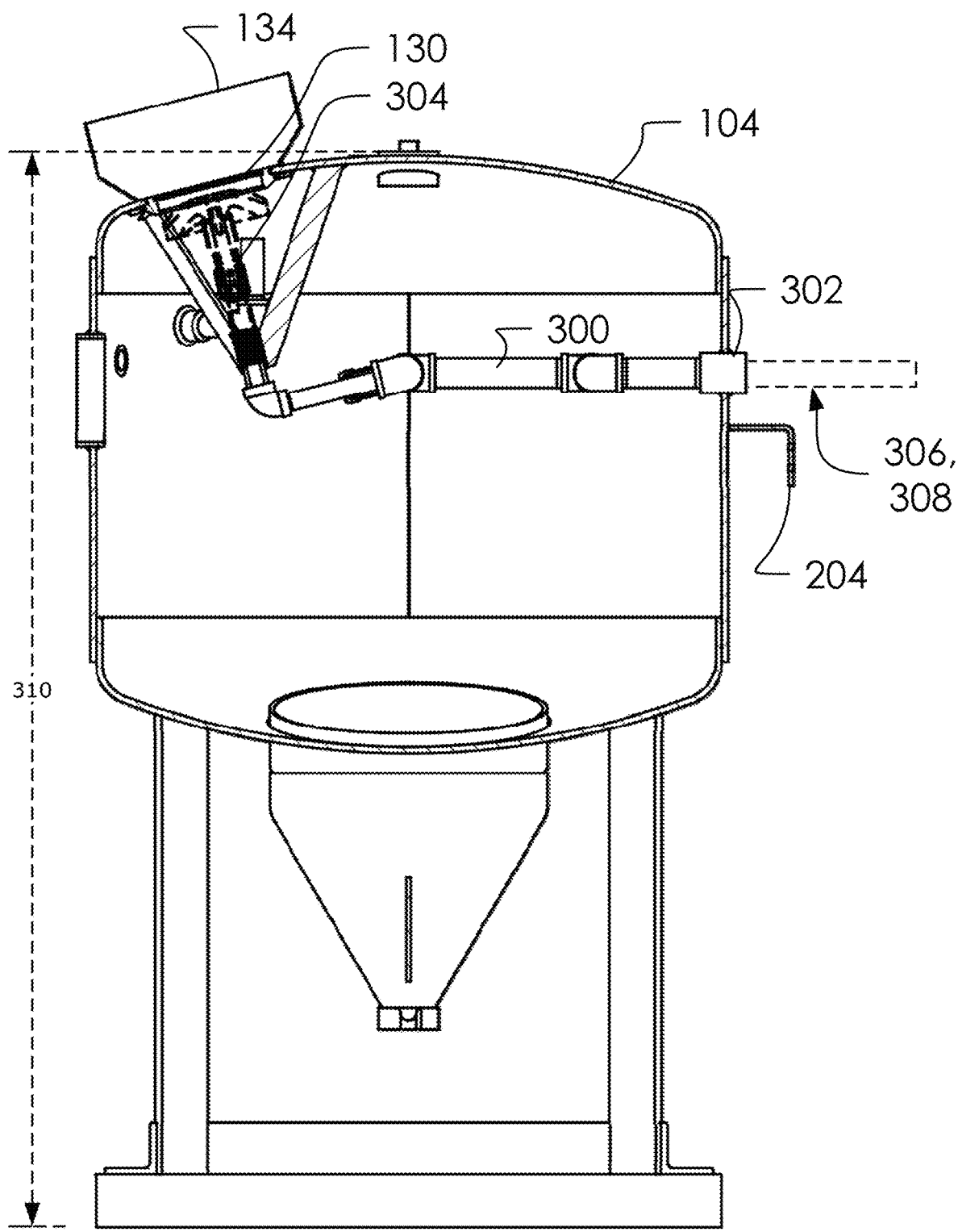
FIG. 3 illustrates an elevated side view of said tank assembly 100 with at a cross section defined by a cutaway-B 140.

FIG. 3 illustrates an elevated side view of said tank assembly 100 with at a cross section defined by said cutaway-B 140.

In one embodiment, said tank assembly 100 can comprise a pop-up air supply 300. Said pop-up air supply 300 can comprise an air inlet 302 in said shell 102 and a second end 304 proximate to said fill aperture 136. In one embodiment, an air supply 306 can be mounted on said air inlet bracket 204 and directed into said air inlet 302 of said pop-up air supply 300. Wherein, said second end 304 can provide a compressed air 308 to said second end 304 of said pop-up air supply 300.

In one embodiment, said tank assembly 100 can comprise a height 310 inclusive of said fill funnel 134 at the top down to said base 112.

Figure 4:
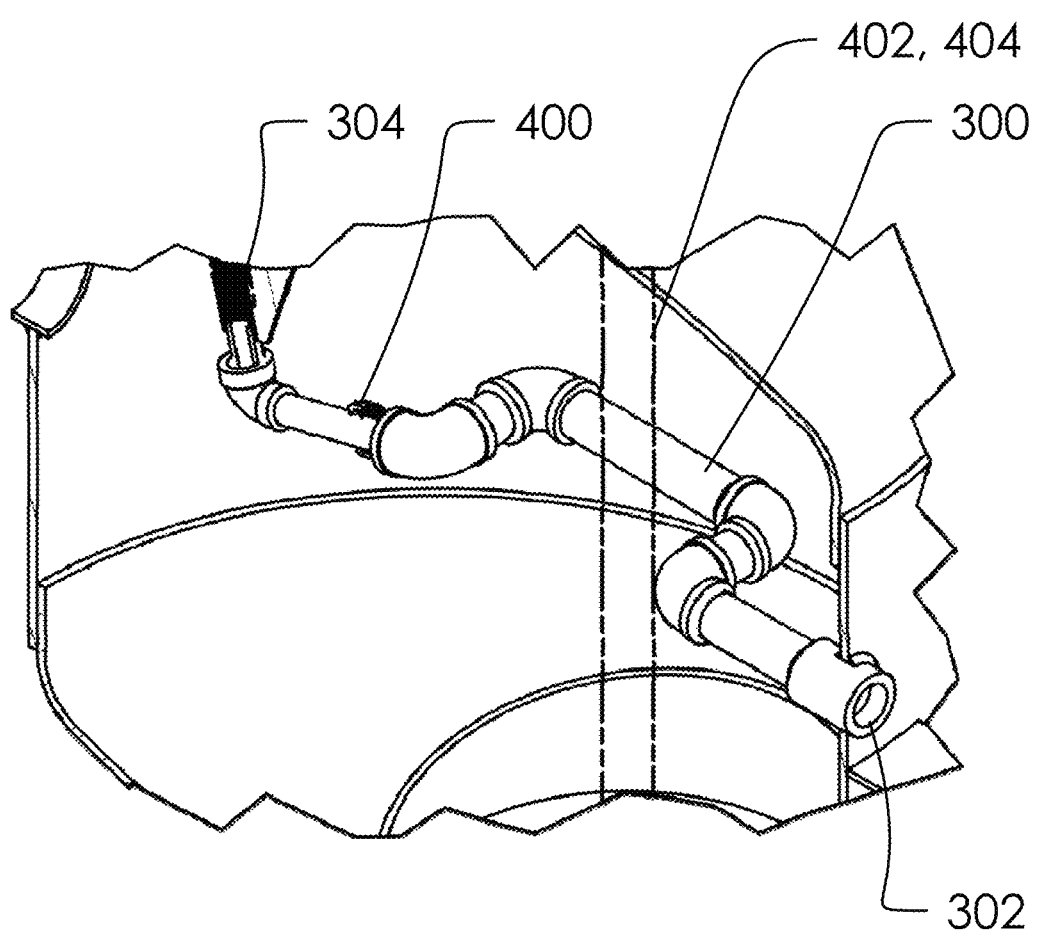
FIG. 4 illustrates a perspective overview of a pop-up air supply 300 in a cutaway view of said tank assembly 100.

FIG. 4 illustrates a perspective overview of said pop-up air supply 300 in a cutaway view of said tank assembly 100.

In one embodiment, said pop-up air supply 300 can comprise a plurality of bends between said air inlet 302 and said second end 304, so as to accommodate other plumbing within said tank assembly 100, or other design parameters. For example, said tank assembly 100 can comprise a plurality of drawtubes 402 where a first drawtube 404 might extend between said plurality of drawtube apertures 110 and said lower aperture 118 along said drawtube axis 130.

In one embodiment, a close nipple 400 can be included between said air inlet 302 and said second end 304.

Figure 5:
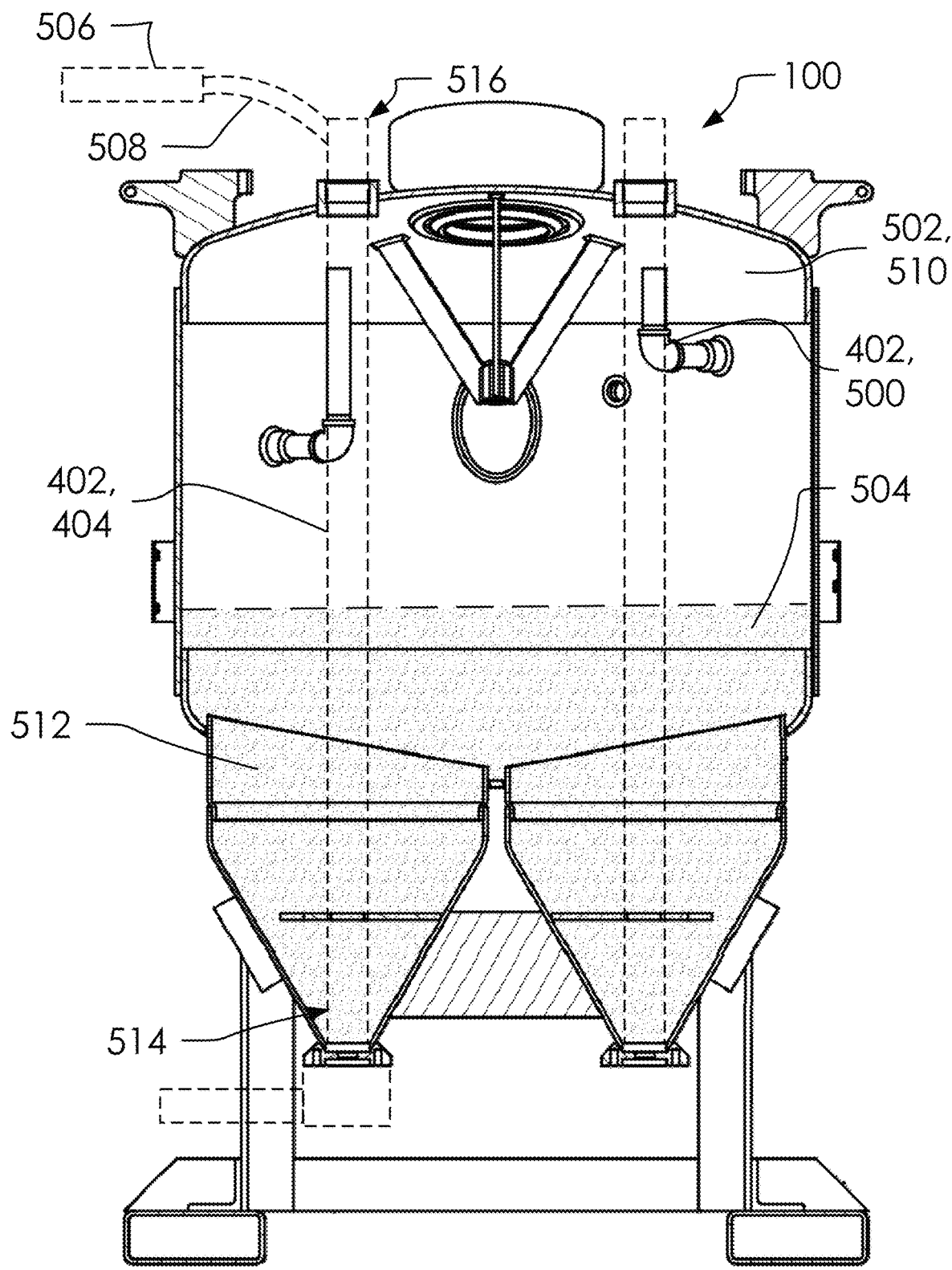
FIG. 5 illustrates an elevated front view of said tank assembly 100 with at a cross section defined by a cutaway-A 200.

FIG. 5 illustrates an elevated front view of said tank assembly 100 with at a cross section defined by said cutaway-A 200.

In one embodiment, said plurality of drawtubes 402 can comprise said first drawtube 404 and a second drawtube 500. Wherein, said plurality of drawtubes 402 can extend between said plurality of drawtube apertures 110 and said cone flange 120 along said drawtube axis 130. This application incorporates by reference US patent US20180079054A1, which outlines the plumbing of said plurality of drawtubes 402 and said cone flange 120 in greater detail.

It is noted that a slurry mixture 504 is inserted into a slurry reservoir 502 and dispensed primarily through said plurality of conical dispensers 108, as discussed in prior filings by Applicant. In one embodiment, said second drawtube 500 can be inserted into said slurry reservoir 502 through said fill aperture 136 in said head assembly 104.

In one embodiment, each among said plurality of conical dispensers 108 can connected with said compressed air 308 and said slurry mixture 504 at a lower end 514 and one or more spray equipment 506 by one or more fluid lines 508 at an upper end 516.

Said slurry reservoir 502 can comprise an upper reservoir 510 and a conical dispensers reservoir 512.

Figure 6:
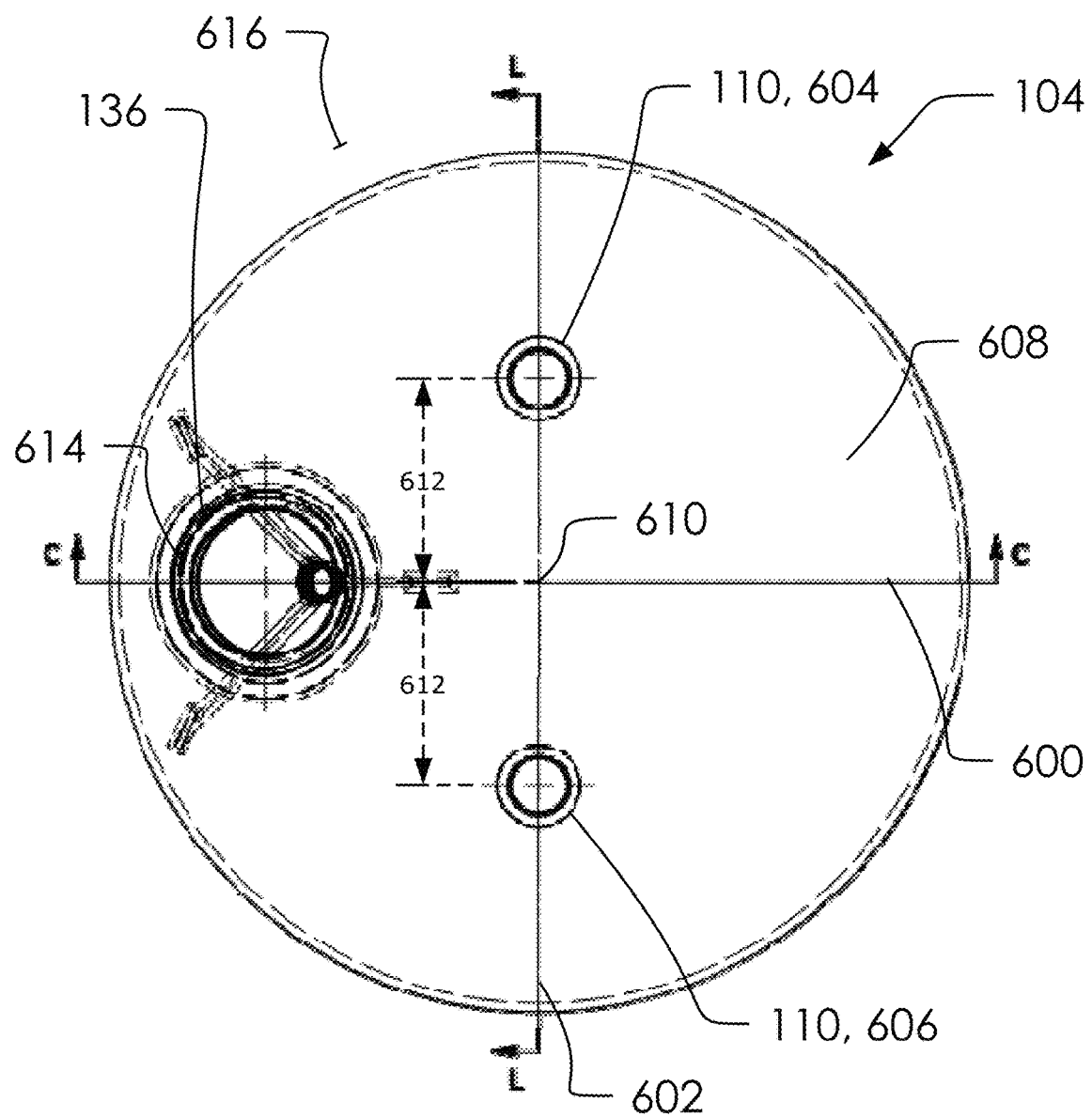
FIG. 6 illustrates an elevated top view of a head assembly 104.

FIG. 6 illustrates an elevated top view of said head assembly 104.

As illustrated, a cutaway-C 600 and a cutaway-L 602 show two cross-section views of said head assembly 104, which will be discussed below.

In one embodiment, said plurality of drawtube apertures 110 can comprise a first drawtube aperture 604 and a second drawtube aperture 606. In one embodiment, each among said plurality of drawtube apertures 110 can be in a top portion 608 of said head assembly 104. In one embodiment, said plurality of drawtube apertures 110 can be at an equal spacing 612 from a center point 610 in said head assembly 104.

In one embodiment, a fill ring 614 can be attached within said fill aperture 136 and configured to selectively seal with said fill funnel 134 to create a seal between said slurry reservoir 502 and an outside environment 616.

Figure 7:
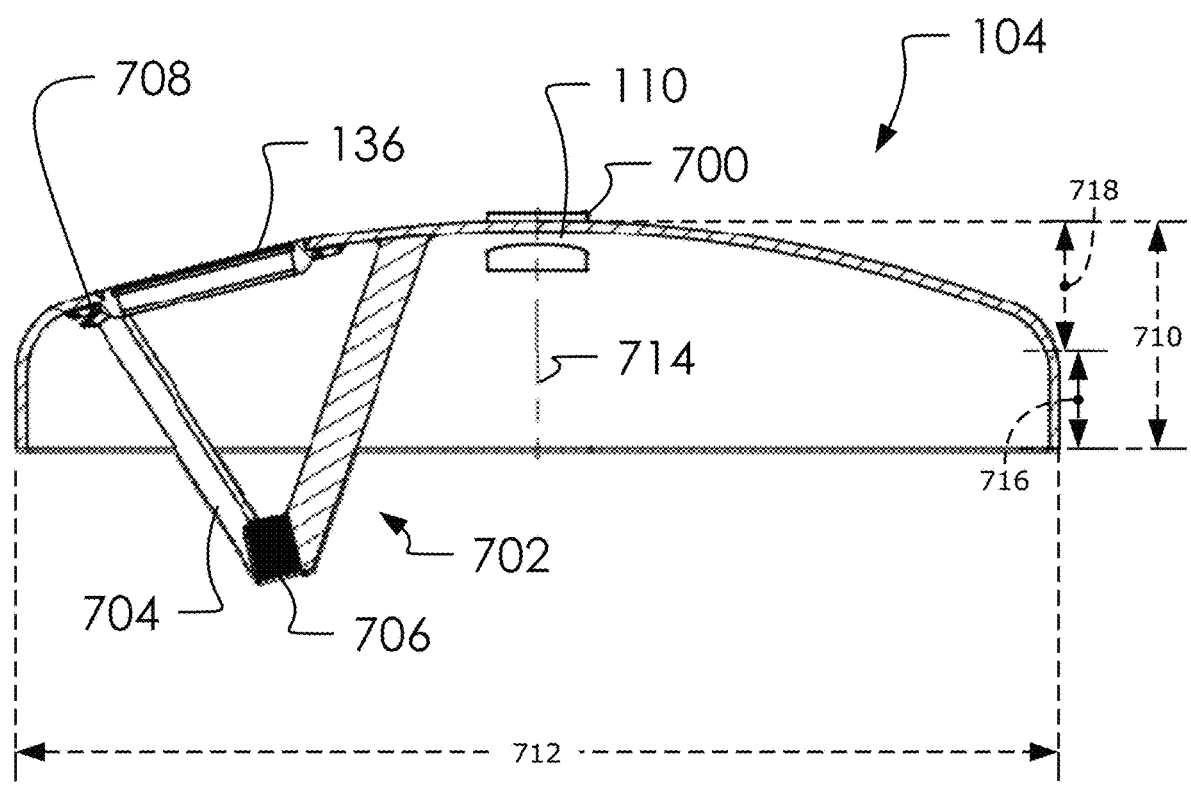
FIG. 7 illustrates an elevated side view of said head assembly 104 at a cutaway-C 600.

FIG. 7 illustrates an elevated side view of said head assembly 104 at said cutaway-C 600.

In one embodiment, each among said plurality of drawtube apertures 110 can comprise a coupling 700 configured to selectively seal said slurry reservoir 502 with said plurality of drawtubes 402 at said plurality of drawtube apertures 110.

In one embodiment, said head assembly 104 can further comprise a support assembly 702 arranged around said fill aperture 136 and inside of said slurry reservoir 502. In one embodiment, said support assembly 702 can comprise three legs 704 in a tripod configuration supported by a coupling 706 and a reinforcement ring 708.

Said head assembly 104 can comprise a height 710, a width 712, a center support axis 714, a cylindrical section 716 and a domed section 718.

Figure 8:
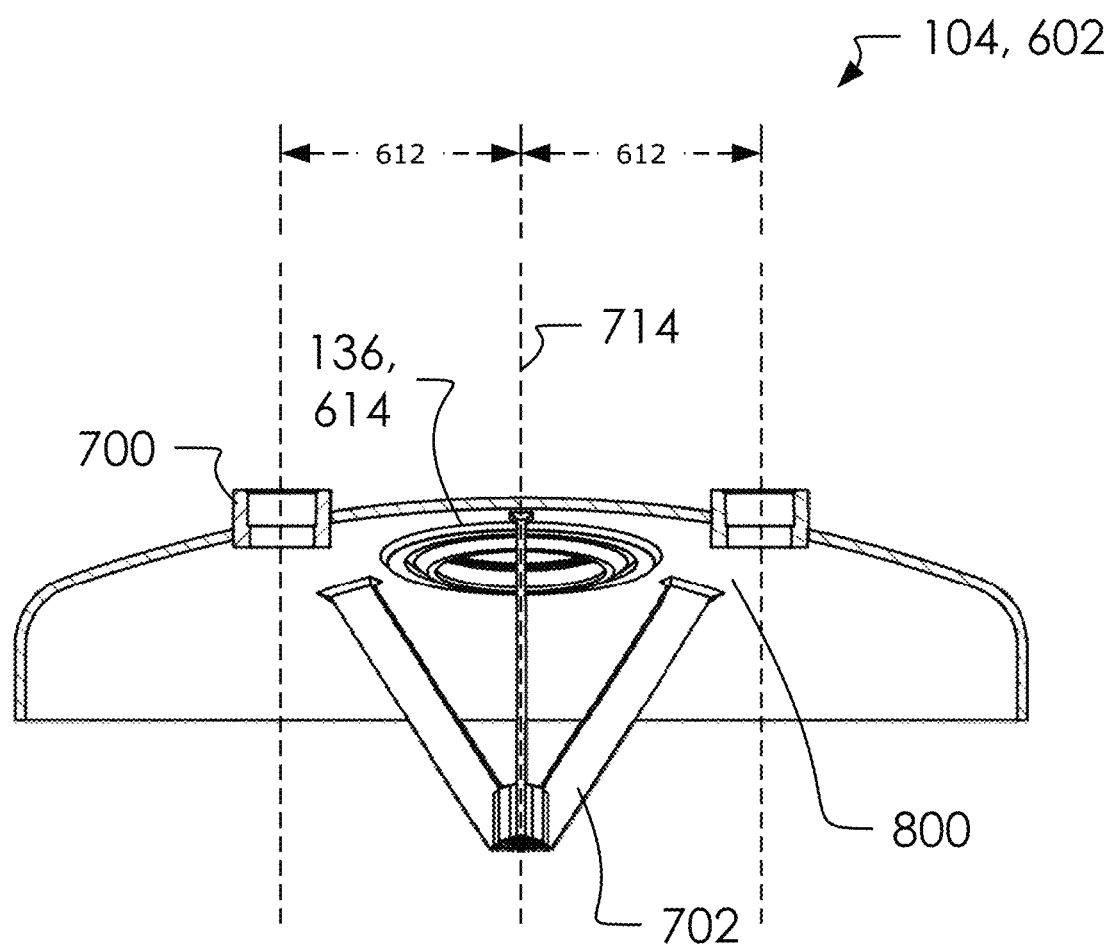
FIG. 8 illustrates an elevated side view of said head assembly 104 at a cutaway-L 602.

FIG. 8 illustrates an elevated side view of said head assembly 104 at said cutaway-L 602.

As illustrated, said three legs 704 of said support assembly 702 can extend down from an inside surface of said head assembly 104 to connect with one another at said center support axis 714.

Figure 9A:
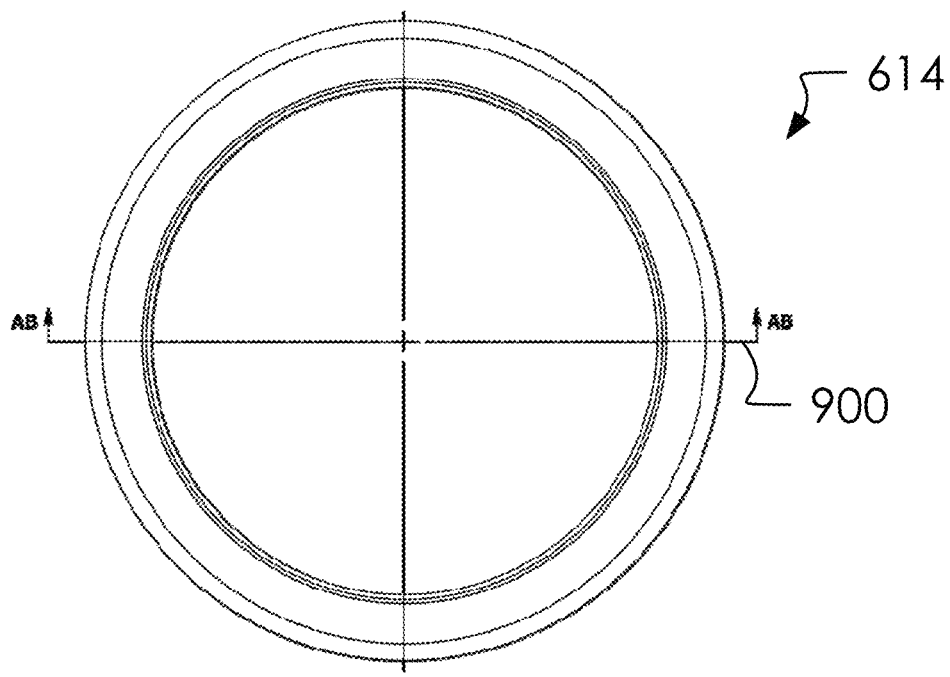
FIGS. 9A, 9B, and 9C illustrate a fill ring 614 in an elevated top view, side cross-section view, and elevated side view.
Figure 9B:
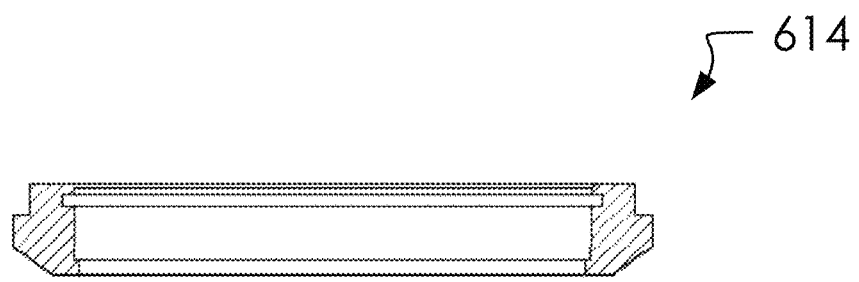
Figure 9C:
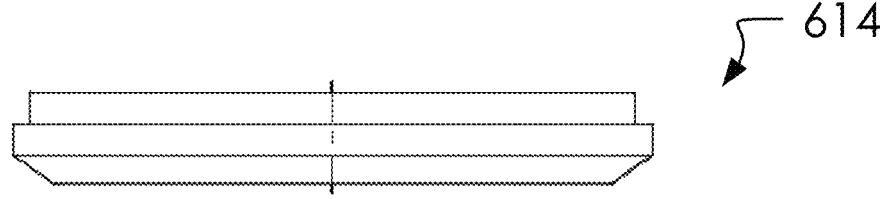

FIGS. 9A, 9B, and 9C illustrate said fill ring 614 in an elevated top view, side cross-section view, and elevated side view.

As shown, a cutaway-AB 900 can illustrate a cross-section of said fill ring 614.

Figures 10A, 10B:
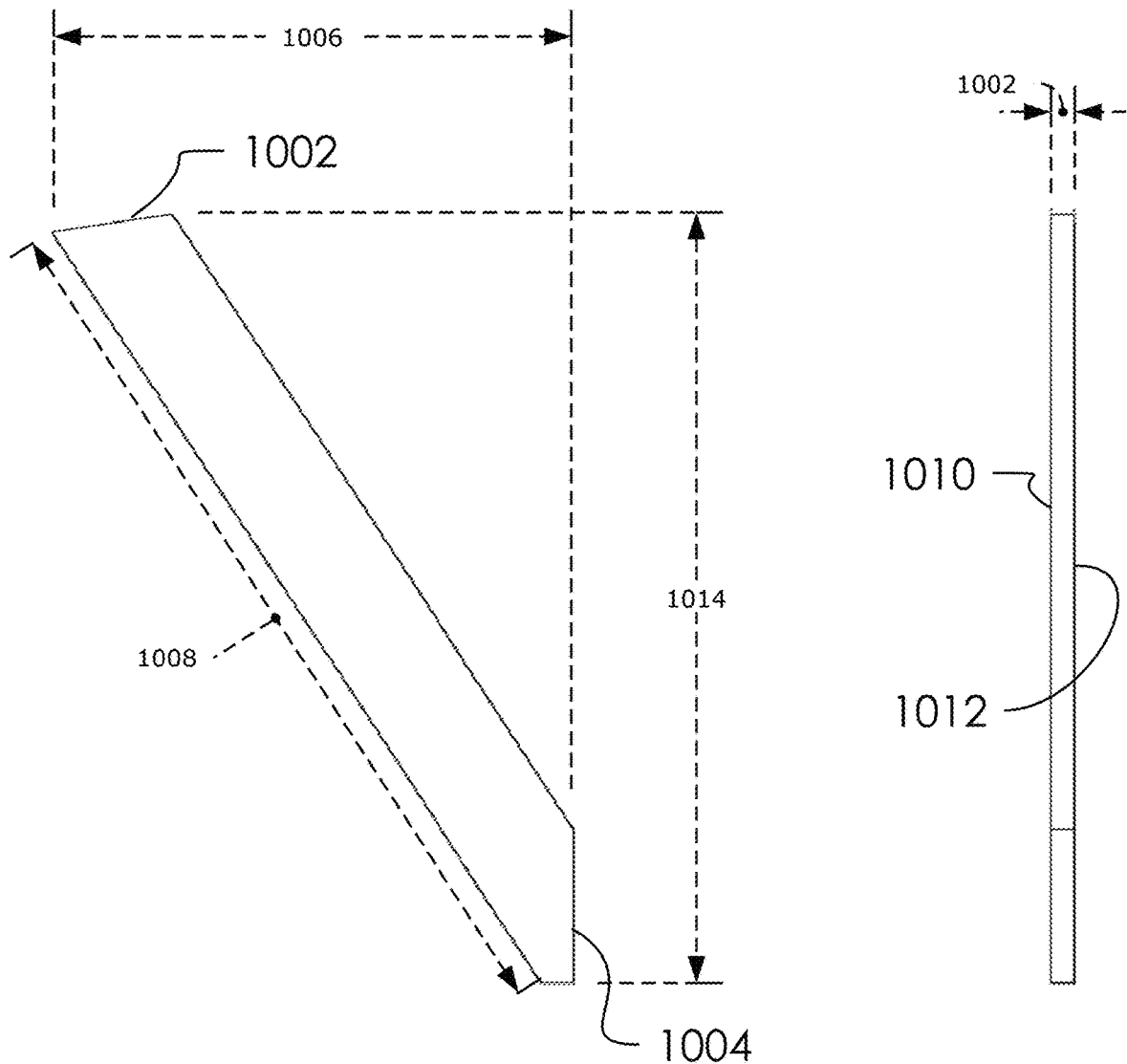
FIGS. 10A, and 10B illustrate an elevated front and first side view of a first leg 1000 from a three legs 704.

FIGS. 10A, and 10B illustrate an elevated front and first side view of a first leg 1000 from said three legs 704.

In one embodiment, each among said three legs 704 can comprise a distal end 1002, a proximate end 1004, a width 1006, a length 1008, a first side 1010, a second side 1012, and a height 1014. In one embodiment, said proximate end 1004 of each of said three legs 704 can be bound together with said coupling 706, and said width 1006 can each be connected to a top inner surface of said head assembly 104.

Figure 11A:
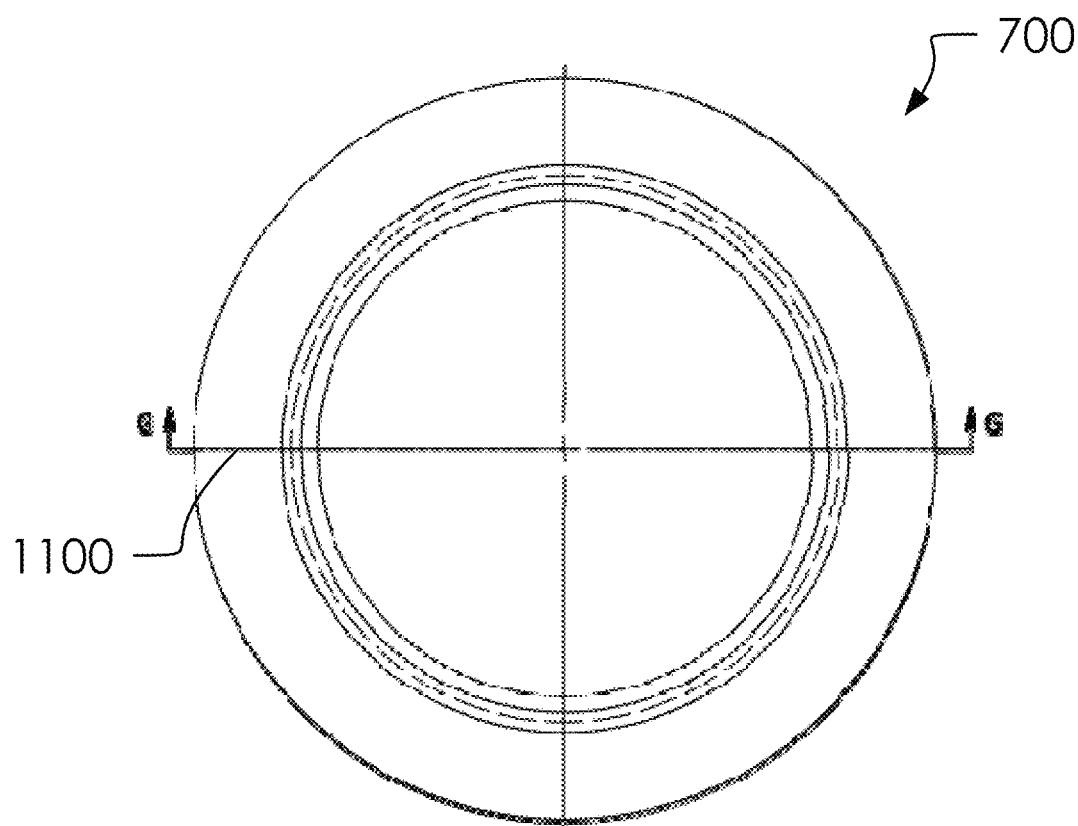
FIGS. 11A, and 11B illustrate an elevated top view and elevated side view of a coupling 700.
Figure 11B:
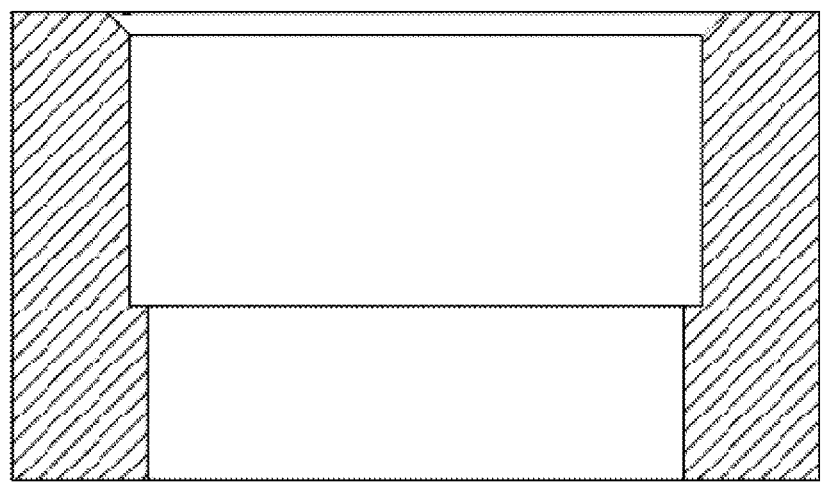

FIGS. 11A, and 11B illustrate an elevated top view and elevated side view of said coupling 700.

As shown, a cutaway-G 1100 can illustrate a cross-section of said coupling 700.

Figure 12A:
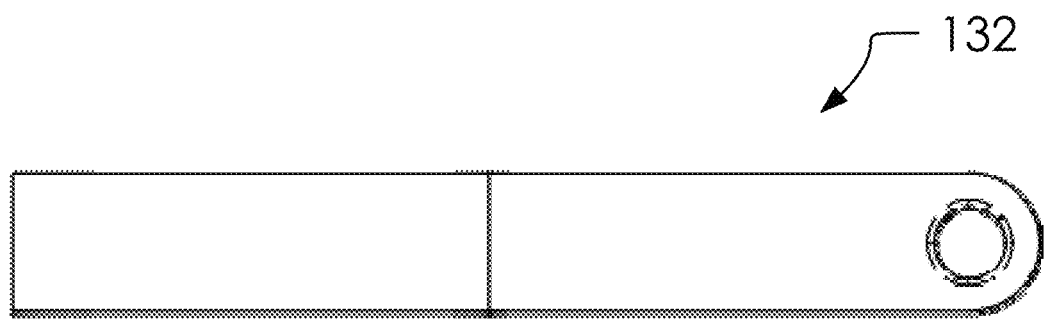
FIGS. 12A, and 12B illustrate an elevated top view and side view of one or more rocker pedestals 132.
Figure 12B:
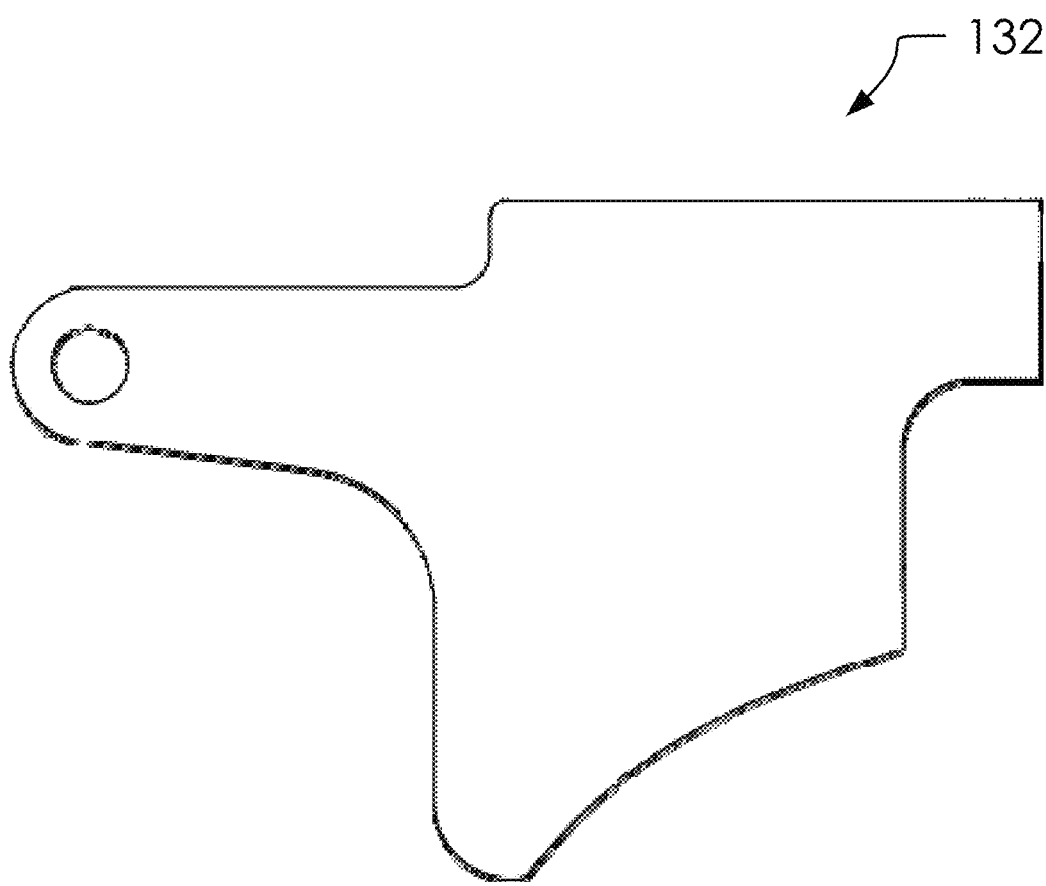

FIGS. 12A, and 12B illustrate an elevated top view and side view of said one or more rocker pedestals 132.

Figure 13A:
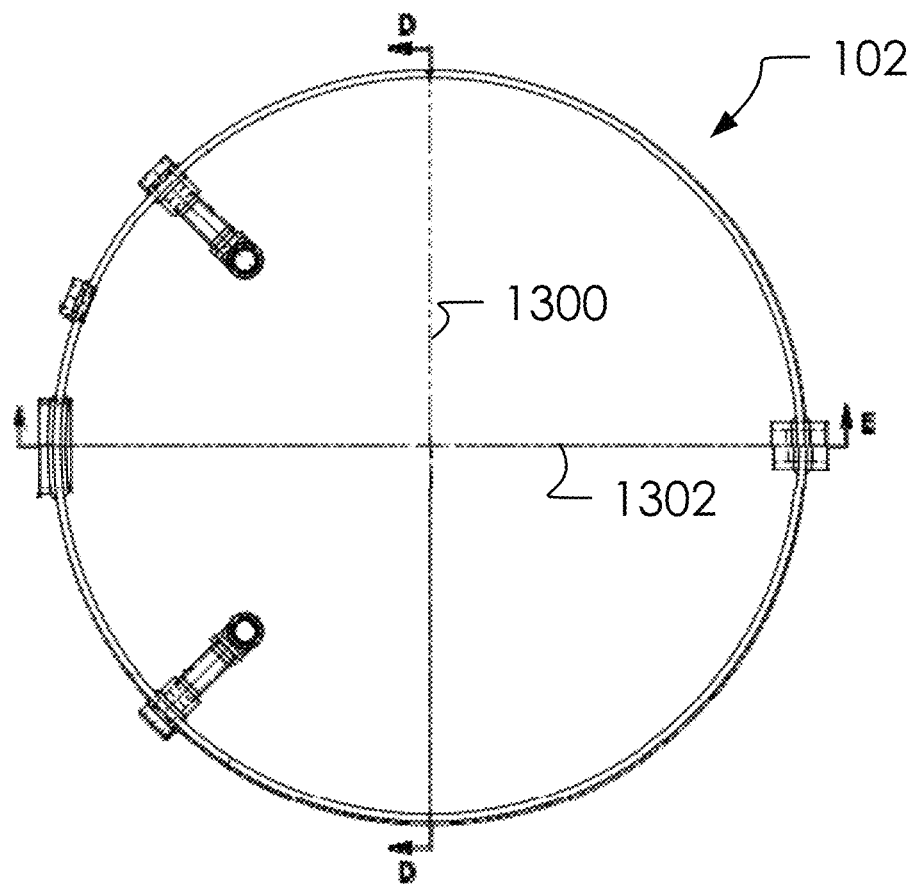
FIGS. 13A, and 13B illustrate an elevated top view and side view of a shell 102.
Figure 13B:
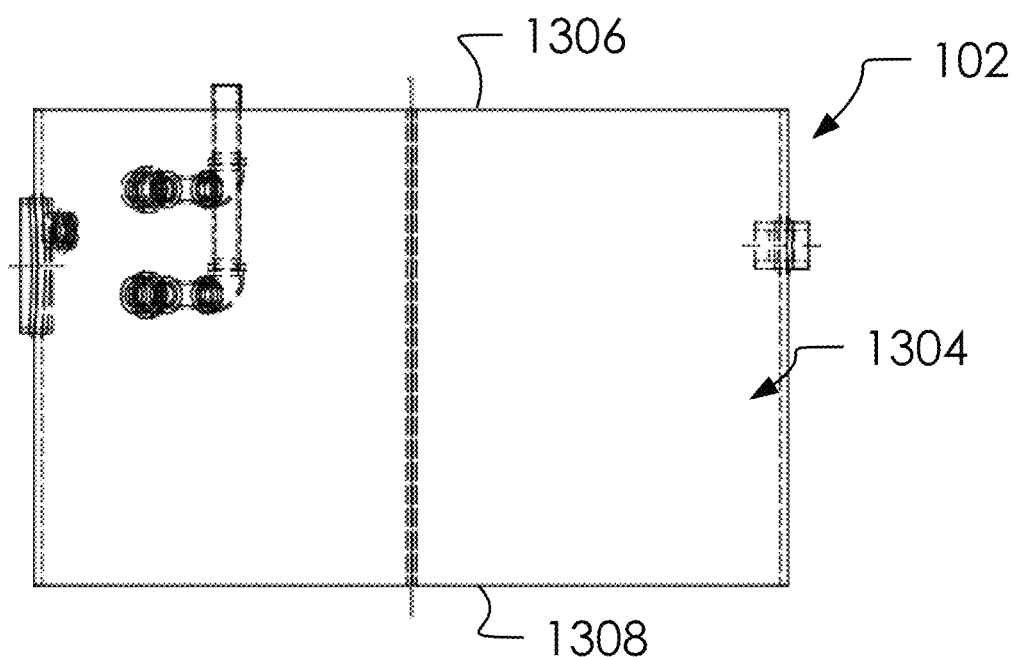

FIGS. 13A, and 13B illustrate an elevated top view and side view of said shell 102.

As shown, a cutaway-D 1300 and a cutaway-E 1302 can illustrate cross-sections of said shell 102.

Said shell 102 can comprise a central shell portion 1304 which can comprise a substantially hollow cylinder. Said central shell portion 1304 can comprise a top edge 1306 and a bottom edge 1308.

Figure 14A:
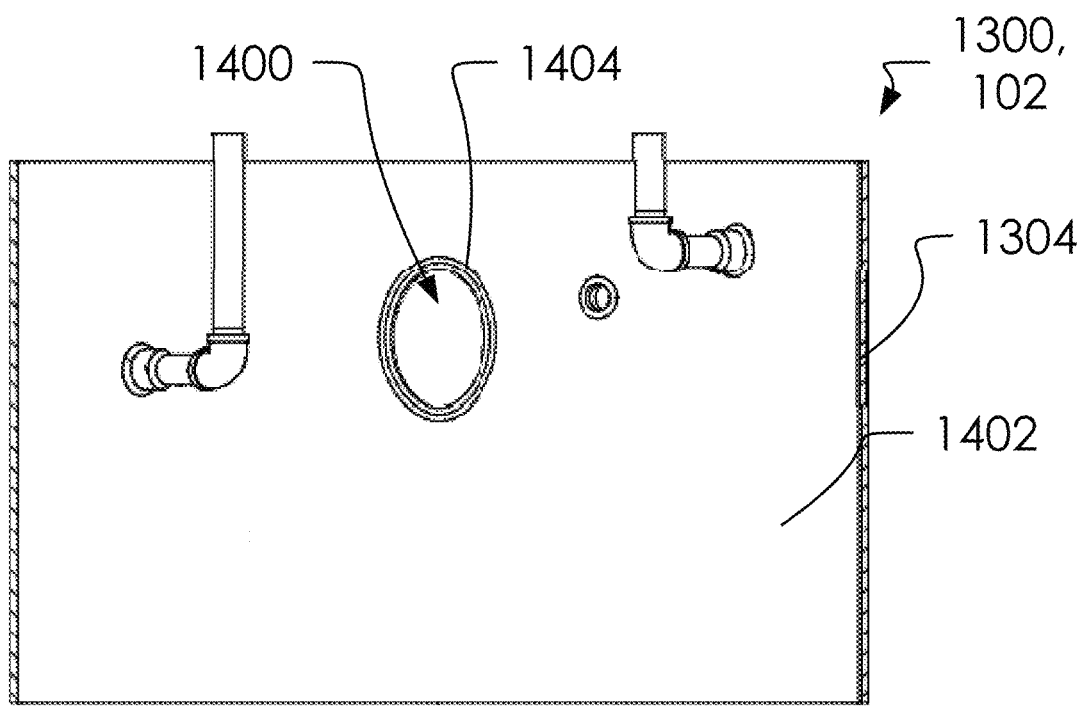
FIGS. 14A, and 14B illustrate an elevated front view of a central shell portion 1304 of said shell 102 at a cutaway-D 1300 and a cutaway-E 1302, respectively.
Figure 14B:
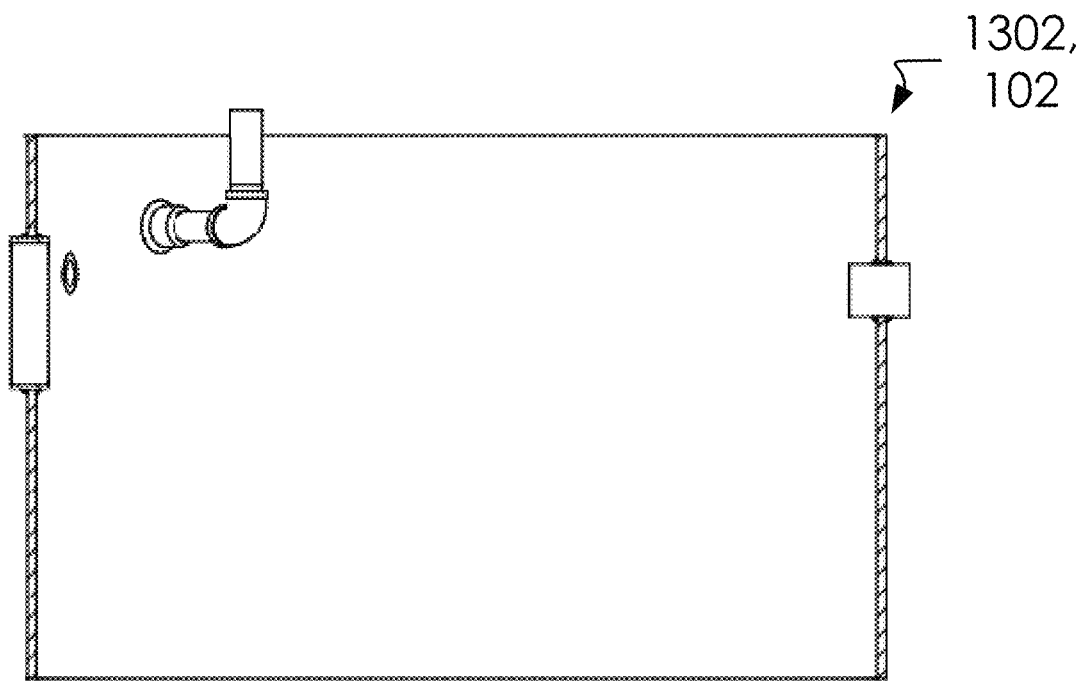

FIGS. 14A, and 14B illustrate an elevated front view of said central shell portion 1304 of said shell 102 at said cutaway-D 1300 and said cutaway-E 1302, respectively.

In one embodiment, said shell 102 can comprise a hand hole aperture 1400 in a sidewall 1402. Said hand hole aperture 1400 can be surrounded by a hand hole ring 1404.

Figure 15A:
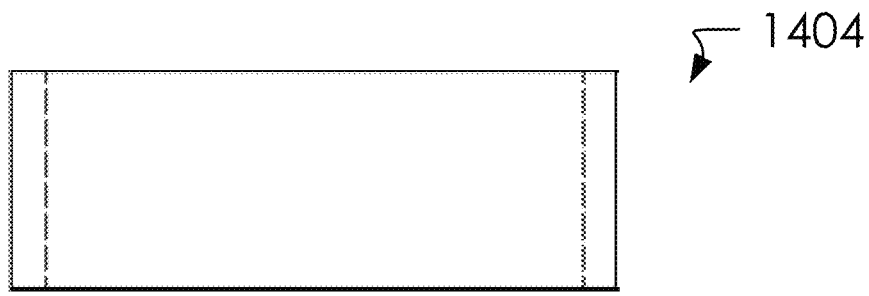
FIGS. 15A, and 15B illustrate an elevated front view and top view of a hand hole ring 1404.
Figure 15B:
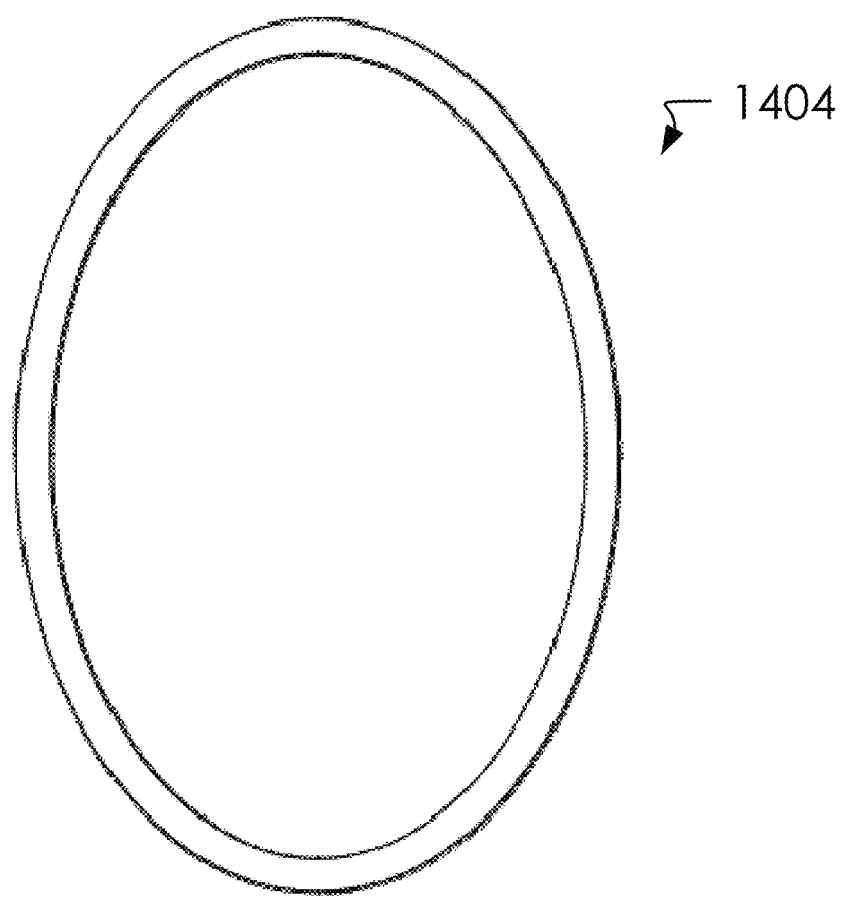

FIGS. 15A, and 15B illustrate an elevated front view and top view of said hand hole ring 1404.

Figure 16A:
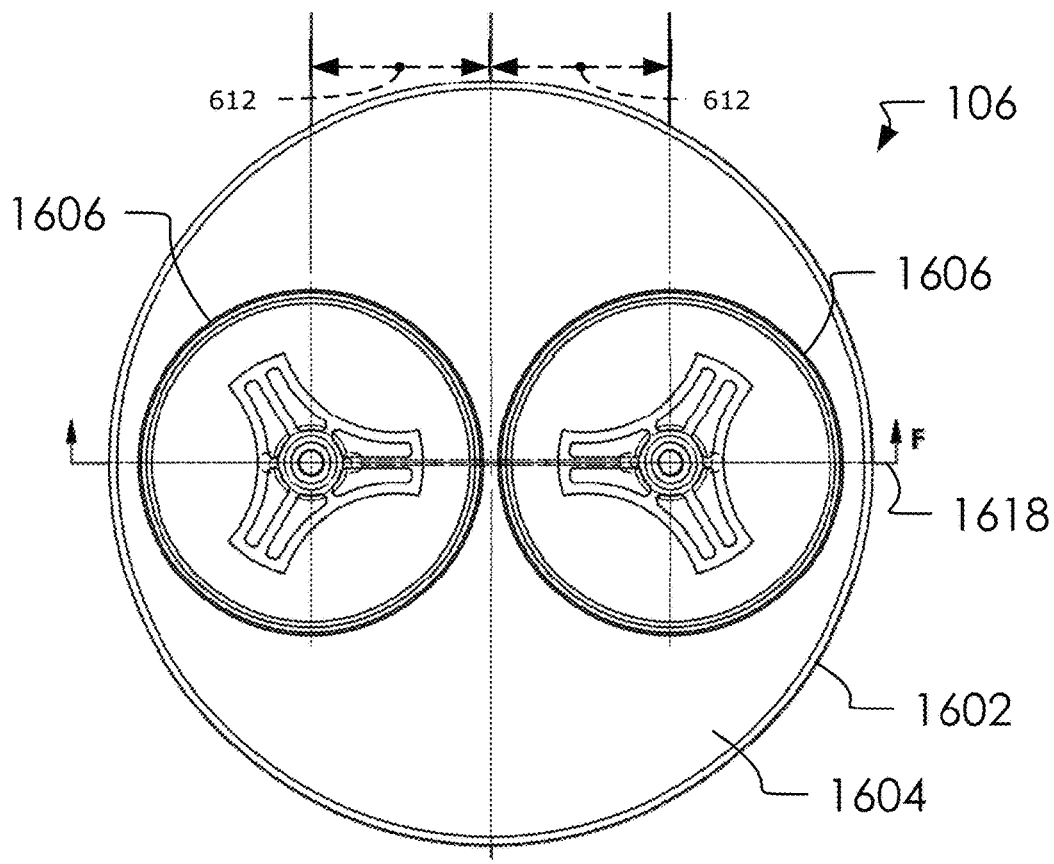
FIGS. 16A, and 16B illustrate an elevated top view and front view of a cone assembly 106.
Figure 16B:
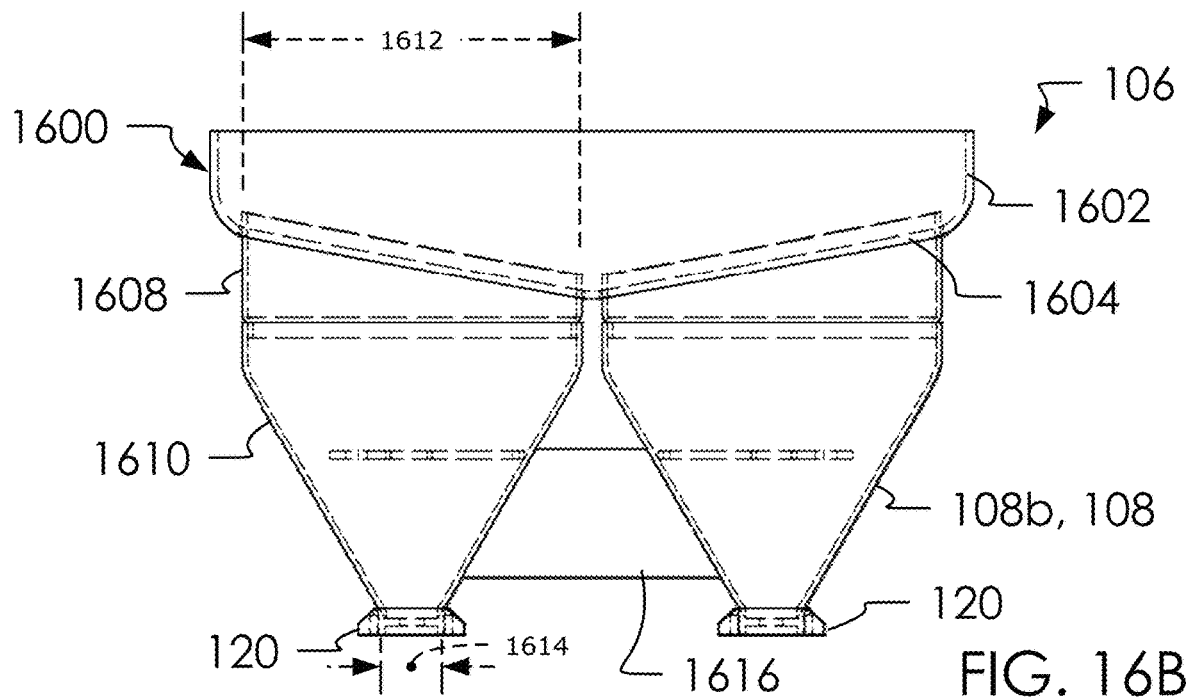

FIGS. 16A, and 16B illustrate an elevated top view and front view of said cone assembly 106.

In one embodiment, said cone assembly 106 can comprise a lower shell 1600 having a sidewall portion 1602 and a conical portion 1604. Said lower shell 1600 can attach to said bottom edge 1308 of said central shell portion 1304 and said top portion 124 can attach to said top edge 1306.

Each of said plurality of conical dispensers 108 can attach to said conical portion 1604 at a plurality of conical dispenser apertures 1606.

Further, each among said plurality of conical dispensers 108 can comprise an upper cylindrical portion 1608 and a lower conical portion 1610. Said upper cylindrical portion 1608 can comprise a first diameter 1612. Likewise, where said upper cylindrical portion 1608 is attached to said lower conical portion 1610, said lower conical portion 1610 can comprise said first diameter 1612 as well. Having a conical shape, said lower conical portion 1610 can comprise a second diameter 1614 at a lower end of said lower conical portion 1610. Said second diameter 1614 can be smaller than said first diameter 1612. Said cone flange 120 can attach to said lower conical portion 1610 at a lower end and can wrap around said second diameter 1614.

In one embodiment, a inter-conical support 1616 can attach between said plurality of conical dispensers 108.

As shown, a cutaway-F 1618 can illustrate cross-sections of said cone assembly 106.

Figure 17:
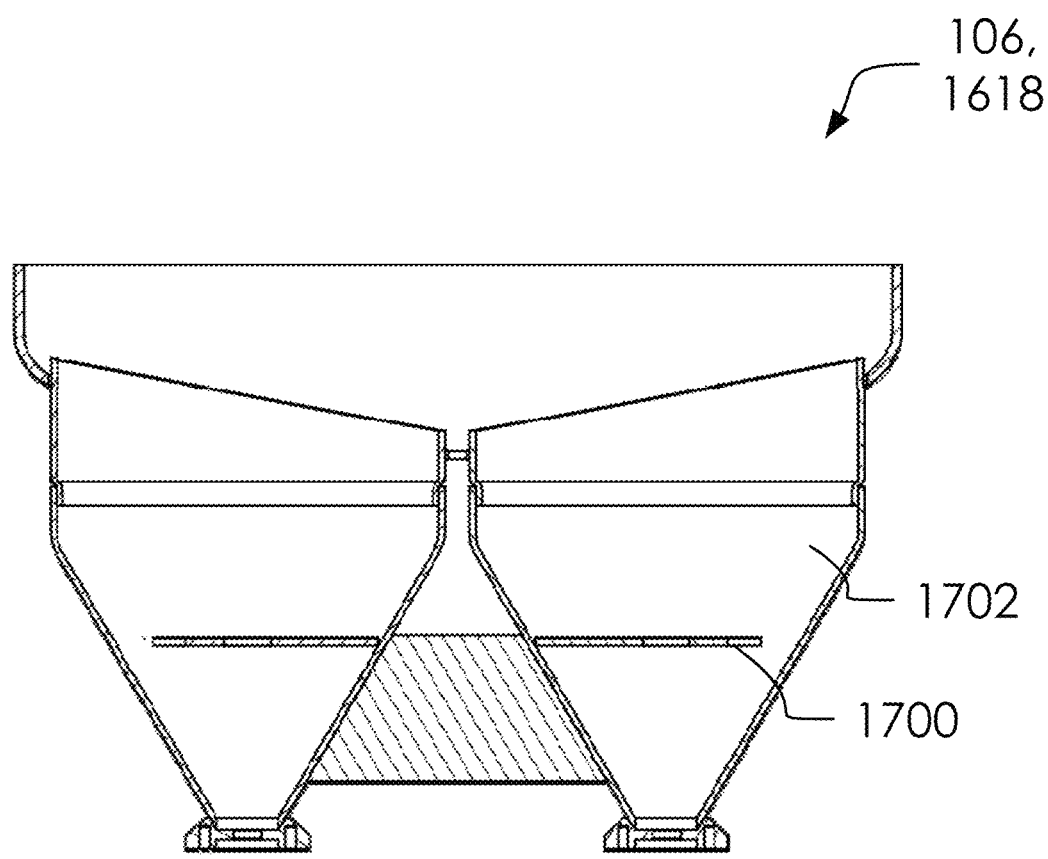
FIG. 17 illustrates an elevated front view of said cone assembly 106 at a cutaway-F 1618.

FIG. 17 illustrates an elevated front view of said cone assembly 106 at said cutaway-F 1618.

Each among said plurality of conical dispensers 108 can comprise a spider guide 1700 within a conical cavity 1702.

Figure 18A:
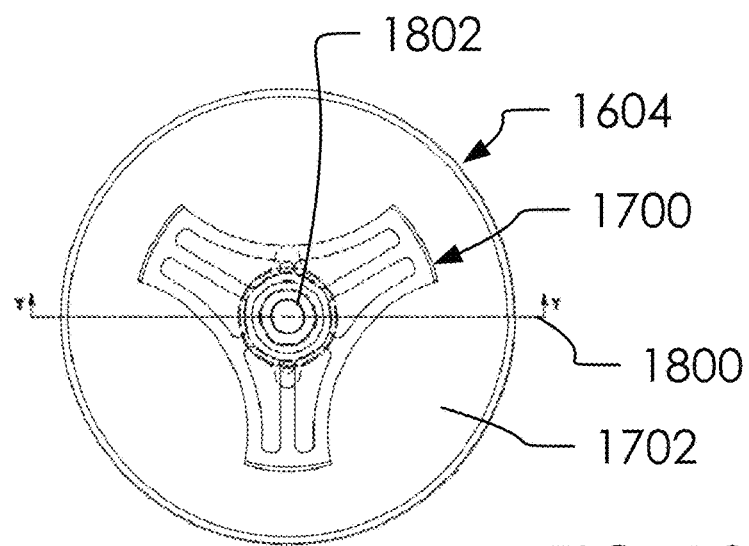
FIGS. 18A, 18B, and 18C illustrate an elevated top view of a conical portion 1604 with a spider guide 1700, and an elevated front view at a cut-away Y 1800 and with wireframe, respectively.
Figure 18B:
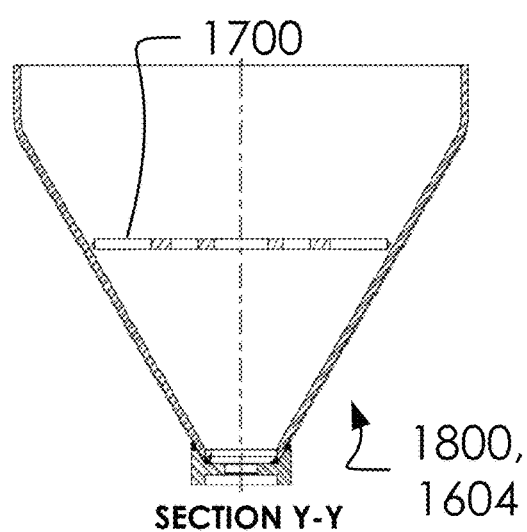
Figure 18C:
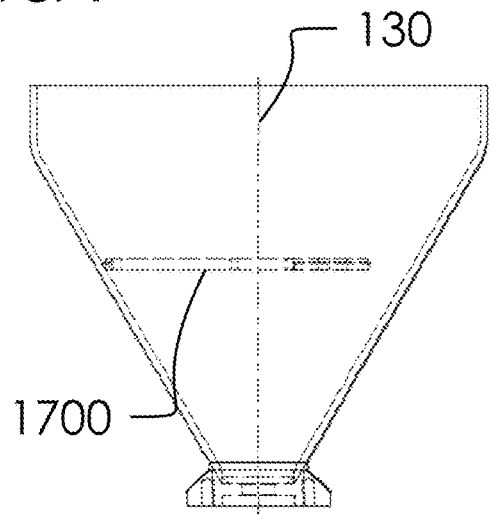

FIGS. 18A, 18B, and 18C illustrate an elevated top view of said conical portion 1604 with said spider guide 1700, and an elevated front view at a cut-away Y 1800 and with wireframe, respectively.

Each of said spider guide 1700 can be centered along said drawtube axis 130 within said conical cavity 1702, having a center drawtube aperture 1802 being configured to allow one among said plurality of drawtubes 402 to pass through. Said spider guide 1700 can be configured to ensure even movement of said slurry mixture 504, as discussed in the parent application to this patent.

As shown, said cut-away Y 1800 can illustrate cross-sections of said conical portion 1604 and said spider guide 1700.

Figure 19A:
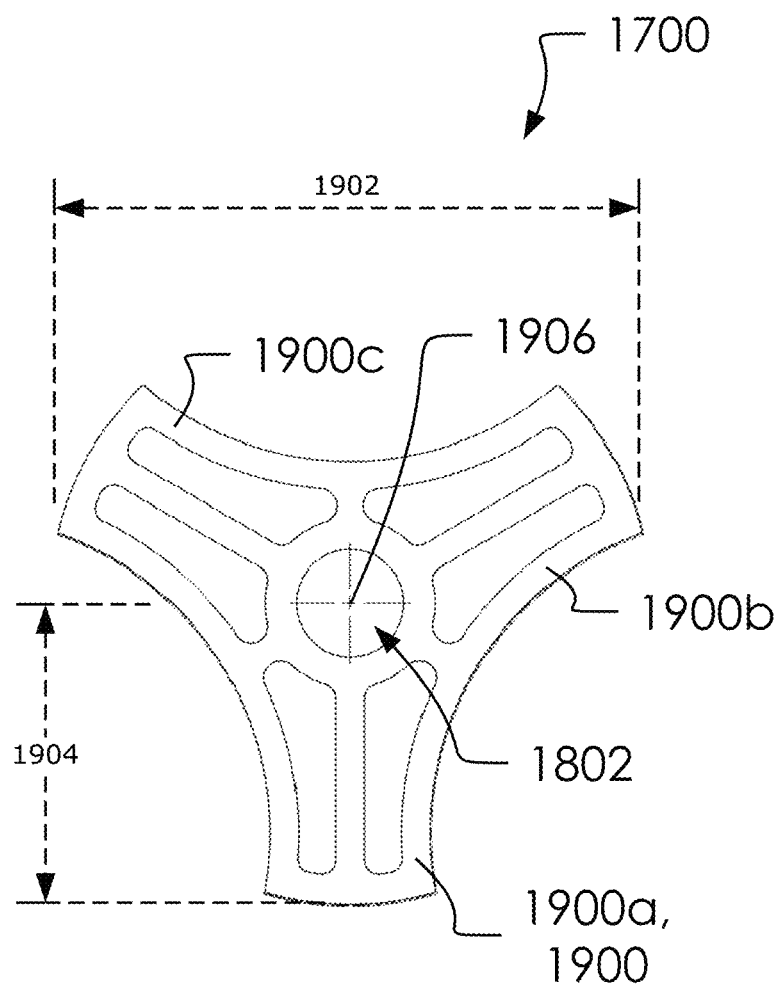
FIGS. 19A, and 19B illustrate an elevated front view and side view of said spider guide 1700.
Figure 19B:
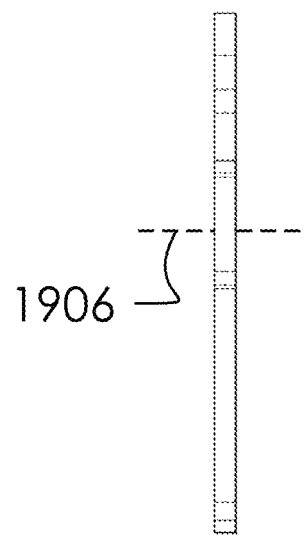

FIGS. 19A, and 19B illustrate an elevated front view and side view of said spider guide 1700.

Each among said spider guide 1700 can comprise a plurality of extensions 1900 (which can comprise a first extension 1900a, a second extension 1900b, and a third extension 1900c), and a width 1902. Each among said plurality of extensions 1900 can comprise an extension length 1904. Said center drawtube aperture 1802 and said spider guide 1700 can be arranged radially about a center axis 1906.

Figure 20A:
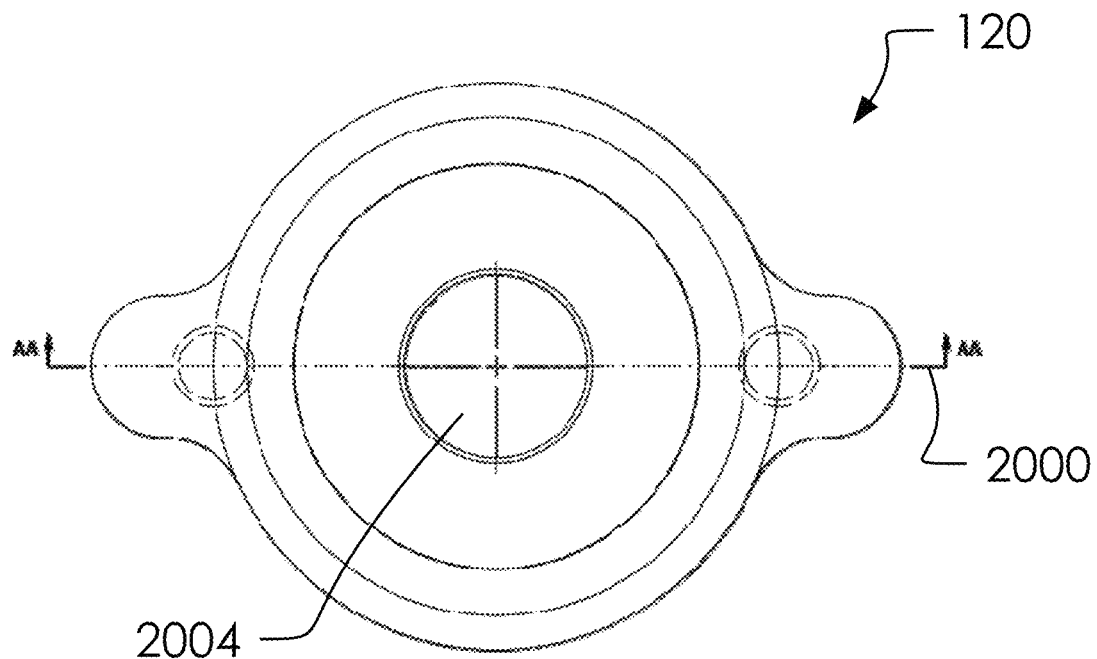
FIGS. 20A, and 20B illustrate an elevated top view and elevated side view of a cone flange 120.
Figure 20B:
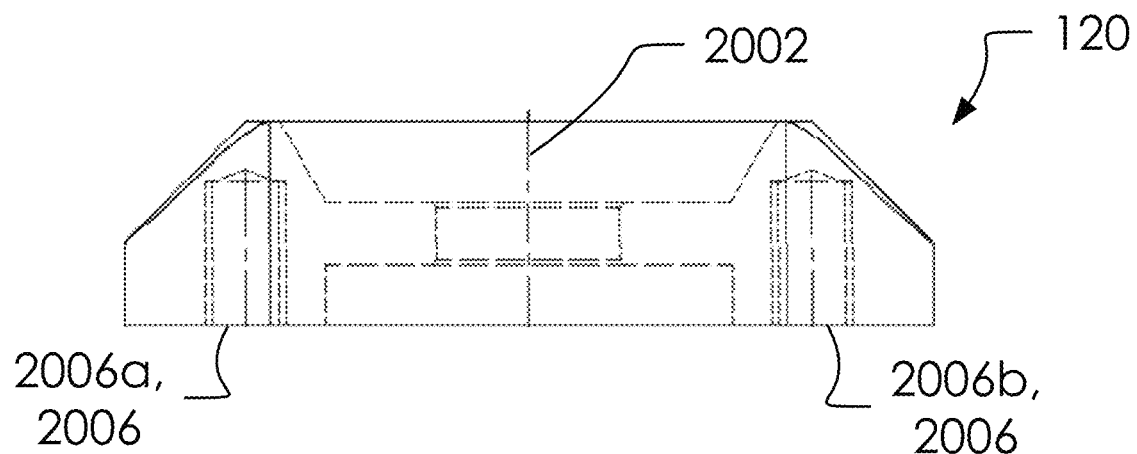

FIGS. 20A, and 20B illustrate an elevated top view and elevated side view of said cone flange 120.

As shown, a cutaway-AA 2000 can illustrate cross-sections of said cone flange 120.

In one embodiment, said cone flange 120 can comprise a center drawtube axis 2002, a lower drawtube aperture 2004, a plurality of fastener bases 2006 (which can comprise a first fastener base 2006a, and a second fastener base 2006b). said center drawtube axis 2002 can align with said drawtube axis 130.

Figure 21A:
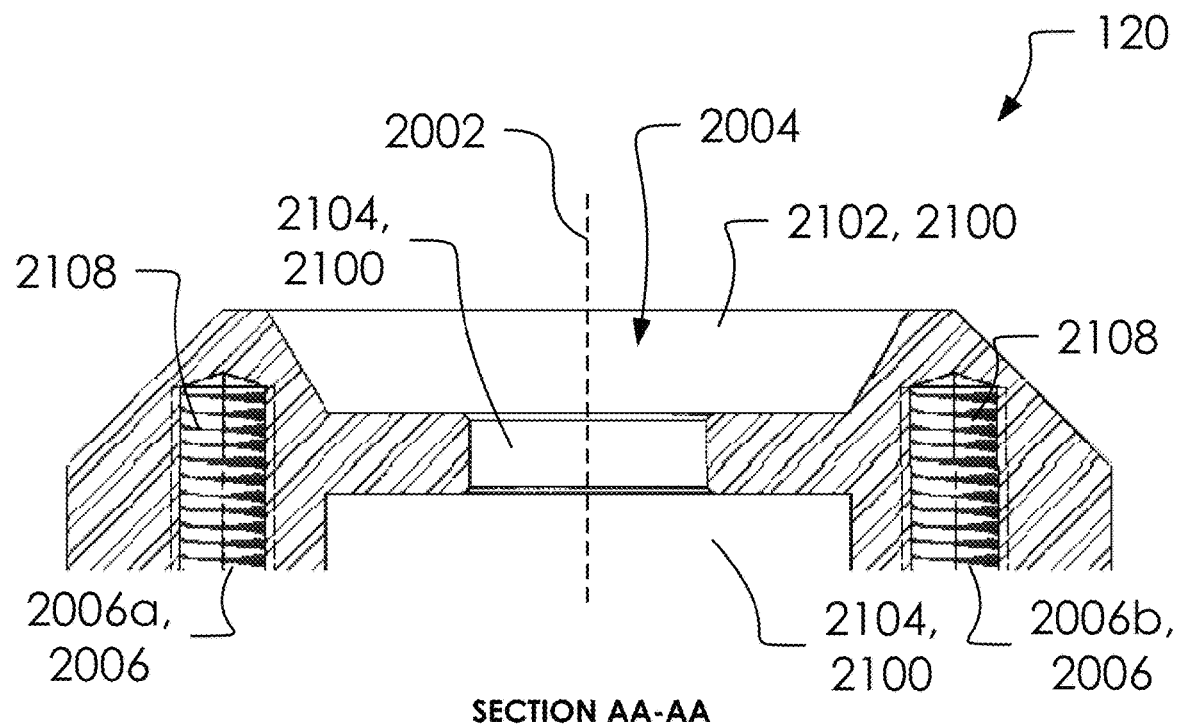
FIGS. 21A, and 21B illustrate an elevated front view at a cutaway-AA 2000 and side view of said cone flange 120.
Figure 21B:
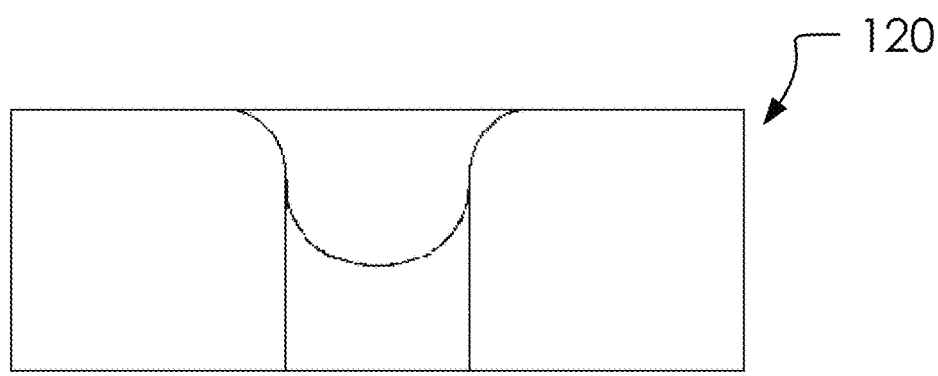

FIGS. 21A, and 21B illustrate an elevated front view at said cutaway-AA 2000 and side view of said cone flange 120.

In one embodiment, said lower drawtube aperture 2004 can comprise a plurality of stepped apertures 2100 in said cone flange 120, which can comprise an upper step 2102, a middle step 2104, and a lower step 2106. Each among said plurality of fastener bases 2006 can comprise a threading 2108.

Figure 22:
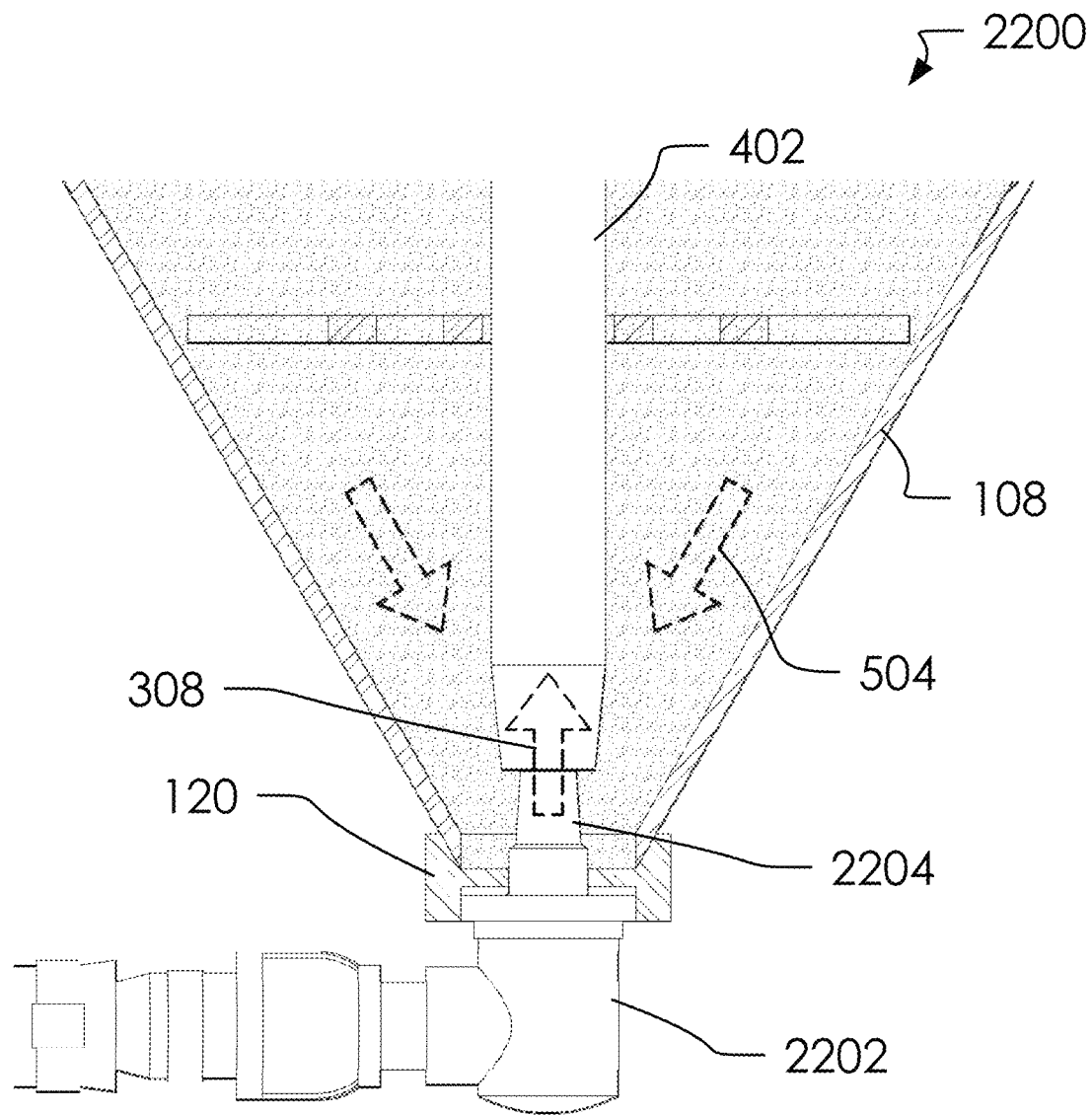
FIG. 22 illustrates an elevated cross-section side view of a plurality of conical dispensers 108 with a plurality of drawtubes 402 receiving a portion of a slurry mixture 504.

FIG. 22 illustrates an elevated cross-section side view of said plurality of conical dispensers 108 with said plurality of drawtubes 402 receiving a portion of said slurry mixture 504.

With reference to U.S. Pat. No. 9,849,560, a parent application to this filing, we now discuss the plumbing of said tank assembly 100.

In one embodiment, said slurry mixture 504 can move into said plurality of drawtubes 402 with said tank assembly 100 in an open configuration 2200; likewise, said compressed air 308 can pass through an inlet 2202, through a coupling nipple 2204 and into said plurality of drawtubes 402, thereby pulling a portion of said slurry mixture 504 at the same time.

With said plurality of drawtubes 402 in a closed configuration (not illustrated), said plurality of drawtubes 402 seals off said compressed air 308 and said plurality of drawtubes 402 from said slurry reservoir 502. Alternatively said open configuration 2200 can comprise a portion of said plurality of drawtubes 402 exposed to both said compressed air 308 and said slurry mixture 504 in said slurry reservoir 502.

Figure 23:
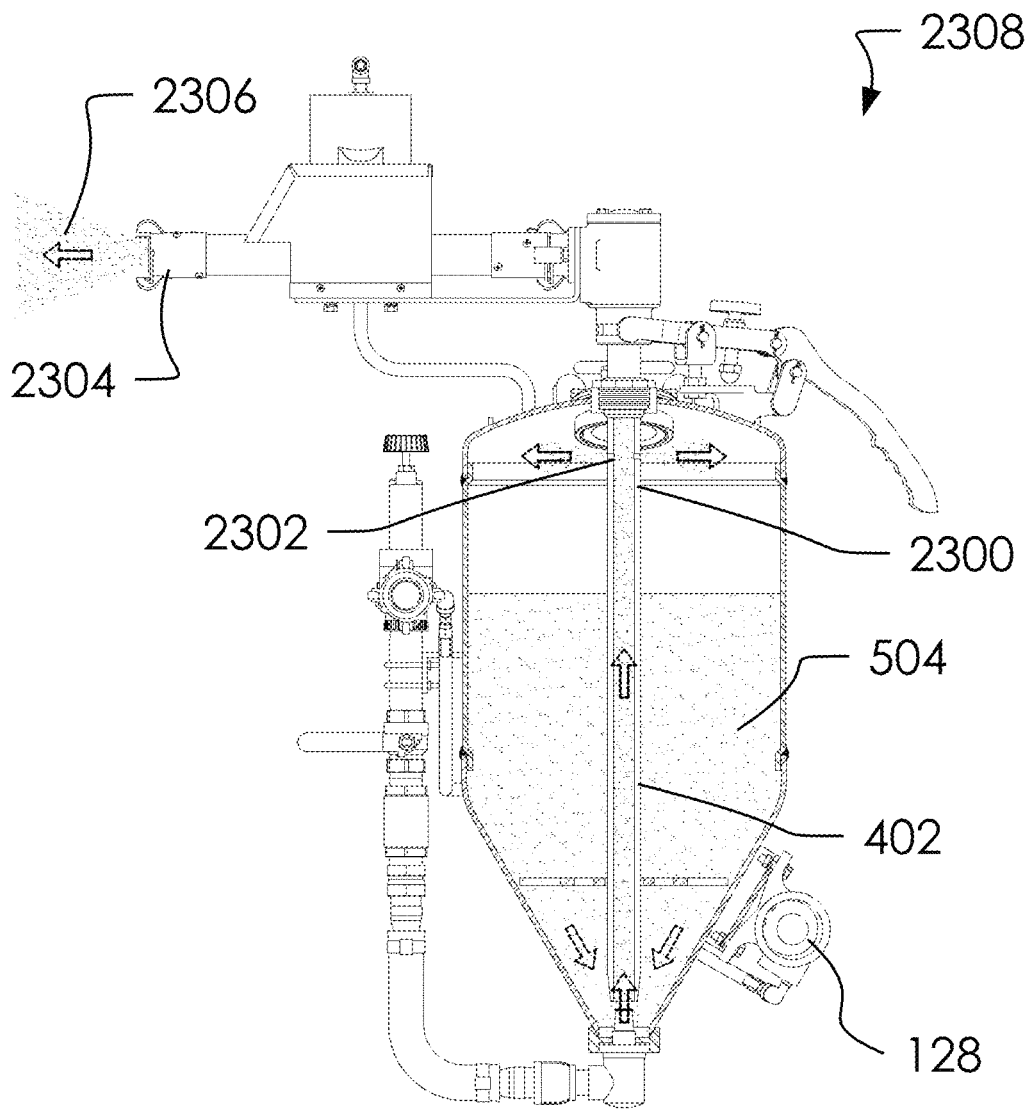
FIG. 23 illustrates an elevated side view of a blast system in cross-section.

FIG. 23 illustrates an elevated side view of a blast system in cross-section.

As illustrated in FIG. 23, a tank assembly 2308 is shown in the parent application noted above (560, filed in 2013). For purposes of this disclosure, the labeled parts will be substantially identical between said tank assembly 100 and said tank assembly 2308.

In one embodiment, a portion of said slurry mixture 504 can enter said plurality of drawtubes 402, mix with a portion of said compressed air 308, pass into an upper portion 2300 of said plurality of drawtubes 402, a portion can exit through one or more internal hydraulic accumulators 2302, and exiting said tank assembly 100 at a blast nozzle 2304 as a slurry blasting fluid 2306. In one embodiment, said one or more internal hydraulic accumulators 2302 can equalize pressure between said plurality of drawtubes 402 and said slurry reservoir 502.

The following listing of the parts in this specification is included for reference:

said tank assembly 100,
said shell 102,
said head assembly 104,
said cone assembly 106,
said plurality of conical dispensers 108,
said plurality of drawtube apertures 110,
said base 112,
said frame 114,
said legs 116,
said lower aperture 118,
said cone flange 120,
said bottom portion 122,
said top portion 124,
said vibrator bracket 126,
said vibrator 128,
said drawtube axis 130,
said one or more rocker pedestals 132,
said fill funnel 134,
said fill aperture 136,
said one or more air supply apertures 138,
said cutaway-B 140,
said upper shell 142,
said cutaway-A 200,
said diameter 202,
said air inlet bracket 204,
said upper shell circumference 206,
said pop-up air supply 300,
said air inlet 302,
said second end 304,
said air supply 306,
said compressed air 308,
said height 310,
said close nipple 400,
said plurality of drawtubes 402,
said first drawtube 404,
said second drawtube 500,
said slurry reservoir 502,
said slurry mixture 504,
said one or more spray equipment 506,
said one or more fluid lines 508,
said upper reservoir 510,
said conical dispensers reservoir 512,
said lower end 514,
said upper end 516,
said cutaway-C 600,
said cutaway-L 602,
said first drawtube aperture 604,
said second drawtube aperture 606,
said top portion 608,
said center point 610,
said equal spacing 612,
said fill ring 614,
said outside environment 616,
said coupling 700,
said support assembly 702,
said three legs 704,
said coupling 706,
said reinforcement ring 708,
said height 710,
said width 712,
said center support axis 714,
said cylindrical section 716, said domed section 718,
said cutaway-AB 900,
said first leg 1000,
said distal end 1002,
said proximate end 1004,
said width 1006,
said length 1008,
said first side 1010,
said second side 1012,
said height 1014,
said cutaway-G 1100,
said cutaway-D 1300,
said cutaway-E 1302,
said central shell portion 1304,
said top edge 1306,
said bottom edge 1308,
said hand hole aperture 1400,
said sidewall 1402,
said hand hole ring 1404,
said lower shell 1600,
said sidewall portion 1602,
said conical portion 1604,
said plurality of conical dispenser apertures 1606,
said upper cylindrical portion 1608,
said lower conical portion 1610,
said first diameter 1612,
said second diameter 1614,
said inter-conical support 1616,
said cutaway-F 1618,
said spider guide 1700,
said conical cavity 1702,
said cut-away Y 1800,
said center drawtube aperture 1802,
said plurality of extensions 1900,
said first extension 1900*a*,
said second extension 1900*b*,
said third extension 1900*c*,
said width 1902,
said extension length 1904,
said center axis 1906,
said cutaway-AA 2000,
said center drawtube axis 2002,
said lower drawtube aperture 2004,
said plurality of fastener bases 2006,
said first fastener base 2006*a*,
said second fastener base 2006*b*,
said plurality of stepped apertures 2100,
said upper step 2102,
said middle step 2104,
said lower step 2106,
said threading 2108,
said open configuration 2200,
said inlet 2202,
said coupling nipple 2204,
said upper portion 2300,
said one or more internal hydraulic accumulators 2302,
said blast nozzle 2304,
said slurry blasting fluid 2306, and
said tank assembly 2308.

The following portion of the specification is written based on the text from the original claims to ensure the specification and claims match one another.

Said tank assembly 100. Said tank assembly 100 comprises said shell 102, said plurality of conical dispensers 108, said plurality of drawtubes 402, said plurality of drawtube apertures 110, said slurry reservoir 502, said one or more spray equipment 506 and said slurry mixture 504.

Said slurry reservoir 502 comprises a fluid reservoir within said shell 102 of said tank assembly 100. Said slurry reservoir 502 comprises said upper reservoir 510 and said conical dispensers reservoir 512. Said conical dispensers reservoir 512 can comprise a fluid space within said plurality of conical dispensers 108. each among said plurality of drawtubes 402 comprise said drawtube axis 130. Said plurality of drawtubes 402 comprise at least said first drawtube 404 and said second drawtube 500. each among said plurality of drawtubes 402 can be configured to enter said slurry reservoir 502 at said plurality of drawtube apertures 110 located in a top portion of said slurry reservoir 502. each among said plurality of drawtubes 402 can be aligned with said plurality of conical dispensers 108 at a bottom portion of said slurry reservoir 502. each among said drawtube axis 130 can be aligned between said plurality of drawtube apertures 110 and said cone flange 120. each among said plurality of conical dispensers 108 comprise said first diameter 1612 and said second diameter 1614. Said first diameter 1612 can be larger than said second diameter 1614. Said second diameter 1614 can be at the lowest part of each among said plurality of conical dispensers 108. Said cone flange 120 connects to said plurality of conical dispensers 108 said lowest part. Said shell 102 comprises said upper shell 142 between said head assembly 104 and said cone assembly 106. Said plurality of drawtube apertures 110 comprise at least said first drawtube aperture 604 and said second drawtube aperture 606. Said upper shell 142 comprises said upper shell circumference 206. at least one among said drawtube axis 130 of said plurality of conical dispensers 108 falls within said upper shell circumference 206. a lower end of said plurality of drawtubes 402 selectively mate with said cone flange 120 to control a flow of said slurry mixture 504 from said slurry reservoir 502 within said plurality of conical dispensers 108. each among said plurality of conical dispensers 108 can be connected with said one or more spray equipment 506 by said one or more fluid lines 508.

Each among said plurality of conical dispensers 108 comprises said vibrator bracket 126 configured to attach to said vibrator 128. Said tank assembly 100 can be configured to activate said vibrator 128 while dispensing said slurry mixture 504 from said slurry reservoir 502 to ensure flow of said slurry mixture 504 into said plurality of conical dispensers 108.

Said tank assembly 100 further comprises said fill funnel 134 attached to said fill aperture 136. Said slurry reservoir 502 can be filled with a portion of said slurry mixture 504 through said fill aperture 136.

Said shell 102 and said head assembly 104 comprises a substantially round cross-section shape as viewed from above, having said diameter 202.

Said tank assembly 100 comprises said pop-up air supply 300, said air inlet 302, and said air supply 306. Said pop-up air supply 300 comprises said air inlet 302 in said shell 102 and said second end 304 proximate to said fill aperture 136. Said air supply 306 can be mounted on said air inlet bracket 204 and directed into said air inlet 302 of said pop-up air supply 300. Said second end 304 can be configured to provide said compressed air 308 to said second end 304 of said pop-up air supply 300.

Each among said plurality of drawtube apertures 110 can be in said top portion 608 of said head assembly 104. Said plurality of drawtube apertures 110 can be at said equal spacing 612 from said center point 610 in said tank assembly 100.

Each among said plurality of drawtube apertures 110 comprises said coupling 700 configured to selectively seal said slurry reservoir 502 with said plurality of drawtubes 402 at said plurality of drawtube apertures 110.

Said head assembly 104 can be configured to further comprise said support assembly 702 arranged around said fill aperture 136 and inside of said slurry reservoir 502. Said support assembly 702 comprises said three legs 704 in a tripod configuration supported by said coupling 706 and said reinforcement ring 708. Said head assembly 104 comprises said height 710, said width 712, said center support axis 714, said cylindrical section 716 and said domed section 718.

Said three legs 704 of said support assembly 702 can be configured to extend down from an inside surface of said head assembly 104 to connect with one another at said center support axis 714. each among said three legs 704 comprises said distal end 1002, said proximate end 1004, said width 1006, said length 1008, said first side 1010, said second side 1012, and said height 1014. Said proximate end 1004 of each of said three legs 704 can be bound together with said coupling 706.

Said upper shell 142 comprises said central shell portion 1304 which comprises a substantially hollow cylinder. Said upper shell 142 comprises said top edge 1306 and said bottom edge 1308. Said cone assembly 106 can be configured to attach to said bottom edge 1308 of said upper shell 142. Said head assembly 104 can be configured to attach to said top edge 1306 of said upper shell 142.

Said cone assembly 106 comprises said lower shell 1600 having said sidewall portion 1602 and said conical portion 1604.

Said conical portion 1604 comprises said lower shell 1600. each of said plurality of conical dispensers 108 can be configured to attach to said conical portion 1604 at said plurality of conical dispenser apertures 1606. each among said plurality of conical dispensers 108 comprises said upper cylindrical portion 1608 and said lower conical portion 1610. Said upper cylindrical portion 1608 comprises said first diameter 1612. where said upper cylindrical portion 1608 can be attached to said lower conical portion 1610, said lower conical portion 1610 comprises said first diameter 1612. Said lower conical portion 1610 comprises said second diameter 1614 at a lower end of said lower conical portion 1610. Said second diameter 1614 can be smaller than said first diameter 1612. Said cone flange 120 can be configured to attach to said lower conical portion 1610 at a lower end and can be configured to wrap around said second diameter 1614.

Each among said plurality of conical dispensers 108 comprises said spider guide 1700 within said conical cavity 1702. each of said spider guide 1700 can be centered along said drawtube axis 130 within said conical cavity 1702, having said center drawtube aperture 1802 being configured to allow one among said plurality of drawtubes 402 to pass through. Said spider guide 1700 can be configured to ensure even movement of said slurry mixture 504.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A tank assembly, wherein:
   said tank assembly comprises a shell, a plurality of conical dispensers, a plurality of drawtubes, a plurality of drawtube apertures, a slurry reservoir, one or more spray equipment and a slurry mixture;
   said slurry reservoir comprises a fluid reservoir within said shell of said tank assembly;
   said slurry reservoir comprises an upper reservoir and a conical dispensers reservoir;
   said conical dispensers reservoir can comprise a fluid space within said plurality of conical dispensers;
   each among said plurality of drawtubes comprise a drawtube axis;
   said plurality of drawtubes comprise at least a first drawtube and a second drawtube;
   each among said plurality of drawtubes is configured to enter said slurry reservoir at said plurality of drawtube apertures located in a top portion of said slurry reservoir;
   each among said plurality of drawtubes are aligned with said plurality of conical dispensers at a bottom portion of said slurry reservoir;
   each among said drawtube axis is aligned between said plurality of drawtube apertures and a cone flange;
   each among said plurality of conical dispensers comprise a first diameter and a second diameter;
   said first diameter is larger than said second diameter;
   said second diameter is at a lowest part of each among said plurality of conical dispensers;
   said cone flange connects to said plurality of conical dispensers said lowest part;
   said shell comprises an upper shell between a head assembly and a cone assembly;
   said plurality of drawtube apertures comprise at least a first drawtube aperture and a second drawtube aperture;
   said upper shell comprises an upper shell circumference;
   at least one among said drawtube axis of said plurality of conical dispensers falls within said upper shell circumference;
   a lower end of said plurality of drawtubes selectively mate with said cone flange to control a flow of said slurry mixture from said slurry reservoir within said plurality of conical dispensers; and
   each among said plurality of conical dispensers are connected with said one or more spray equipment by one or more fluid lines.

2. The tank assembly of claim 1, wherein:
   each among said plurality of conical dispensers comprises a vibrator bracket configured to attach to a vibrator; and
   said tank assembly is configured to activate said vibrator while dispensing said slurry mixture from said slurry reservoir to ensure flow of said slurry mixture into said plurality of conical dispensers.

3. The tank assembly of claim 1, wherein:
   said tank assembly further comprises a fill funnel attached to a fill aperture; and
   said slurry reservoir is filled with a portion of said slurry mixture through said fill aperture.

4. The tank assembly of claim 1, wherein:
said shell and said head assembly comprises a substantially round cross-section shape as viewed from above, having a diameter.

5. The tank assembly of claim 1, wherein:
said tank assembly comprises a pop-up air supply, an air inlet, and an air supply;
said pop-up air supply comprises said air inlet in said shell and a second end proximate to said fill aperture;
said air supply is mounted on an air inlet bracket and directed into said air inlet of said pop-up air supply; and
said second end is configured to provide a compressed air to said second end of said pop-up air supply.

6. The tank assembly of claim 1, wherein:
each among said plurality of drawtube apertures is in a top portion of said head assembly; and
said plurality of drawtube apertures is at an equal spacing from a center point in said tank assembly.

7. The tank assembly of claim 1, wherein:
each among said plurality of drawtube apertures comprises a coupling configured to selectively seal said slurry reservoir with said plurality of drawtubes at said plurality of drawtube apertures.

8. The tank assembly of claim 1, wherein:
said head assembly is configured to further comprise a support assembly arranged around said fill aperture and inside of said slurry reservoir;
said support assembly comprises a three legs in a tripod configuration supported by a coupling and a reinforcement ring; and
said head assembly comprises a height, a width, a center support axis, a cylindrical section and a domed section.

9. The tank assembly of claim 1, wherein:
said three legs of said support assembly is configured to extend down from an inside surface of said head assembly to connect with one another at said center support axis;
each among said three legs comprises a distal end, a proximate end, a width, a length, a first side, a second side, and a height; and
said proximate end of each of said three legs is bound together with said coupling.

10. The tank assembly of claim 1, wherein:
said upper shell comprises a central shell portion which comprises a substantially hollow cylinder;
said upper shell comprises a top edge and a bottom edge;
said cone assembly is configured to attach to said bottom edge of said upper shell; and
said head assembly is configured to attach to said top edge of said upper shell.

11. The tank assembly of claim 10, wherein:
said cone assembly comprises a lower shell having a sidewall portion and a conical portion.

12. The tank assembly of claim 10, wherein:
said conical portion comprises said lower shell;
each of said plurality of conical dispensers is configured to attach to said conical portion at a plurality of conical dispenser apertures;
each among said plurality of conical dispensers comprises an upper cylindrical portion and a lower conical portion;
said upper cylindrical portion comprises said first diameter;
where said upper cylindrical portion is attached to said lower conical portion, said lower conical portion comprises said first diameter;
said lower conical portion comprises said second diameter at a lower end of said lower conical portion;
said second diameter is smaller than said first diameter; and
said cone flange is configured to attach to said lower conical portion at a lower end and is configured to wrap around said second diameter.

13. The tank assembly of claim 1, wherein:
each among said plurality of conical dispensers comprises a spider guide within a conical cavity;
each of said spider guide is centered along said drawtube axis within said conical cavity, having a center drawtube aperture being configured to allow one among said plurality of drawtubes to pass through; and
said spider guide is configured to ensure even movement of said slurry mixture.

14. The tank assembly of claim 13, wherein:
each among said spider guide comprises a plurality of extensions, and a width;
said plurality of extensions which comprises a first extension, a second extension, and a third extension;
each among said plurality of extensions comprises an extension length; and
said center drawtube aperture and said spider guide is arranged radially about a center axis.

15. A tank assembly, wherein:
said tank assembly comprises a shell, a plurality of conical dispensers, a plurality of drawtubes, a plurality of drawtube apertures, a slurry reservoir, one or more spray equipment and a slurry mixture;
said slurry reservoir comprises a fluid reservoir within said shell of said tank assembly;
said slurry reservoir comprises an upper reservoir and a conical dispensers reservoir;
said conical dispensers reservoir can comprise a fluid space within said plurality of conical dispensers;
each among said plurality of drawtubes comprise a drawtube axis;
said plurality of drawtubes comprise at least a first drawtube and a second drawtube;
each among said plurality of drawtubes is configured to enter said slurry reservoir at said plurality of drawtube apertures located in a top portion of said slurry reservoir;
each among said plurality of drawtubes are aligned with said plurality of conical dispensers at a bottom portion of said slurry reservoir;
each among said drawtube axis is aligned between said plurality of drawtube apertures and a cone flange;
each among said plurality of conical dispensers comprise a first diameter and a second diameter;
said first diameter is larger than said second diameter;
said second diameter is at a lowest part of each among said plurality of conical dispensers;
said cone flange connects to said plurality of conical dispensers said lowest part;
said shell comprises an upper shell between a head assembly and a cone assembly;
said plurality of drawtube apertures comprise at least a first drawtube aperture and a second drawtube aperture;
said upper shell comprises an upper shell circumference;
at least one among said drawtube axis of said plurality of conical dispensers falls within said upper shell circumference;

a lower end of said plurality of drawtubes selectively mate with said cone flange to control a flow of said slurry mixture from said slurry reservoir within said plurality of conical dispensers;

each among said plurality of conical dispensers are connected with said one or more spray equipment by one or more fluid lines;

said upper shell comprises a central shell portion which comprises a substantially hollow cylinder;

said upper shell comprises a top edge and a bottom edge;

said cone assembly is configured to attach to said bottom edge of said upper shell;

said head assembly is configured to attach to said top edge of said upper shell;

each among said plurality of conical dispensers comprises a spider guide within a conical cavity;

each of said spider guide is centered along said drawtube axis within said conical cavity, having a center drawtube aperture being configured to allow one among said plurality of drawtubes to pass through; and said spider guide is configured to ensure even movement of said slurry mixture.

\* \* \* \* \*